(12) United States Patent
Ren et al.

(10) Patent No.: US 12,507,102 B2
(45) Date of Patent: Dec. 23, 2025

(54) INFORMATION REPORTING METHOD, APPARATUS AND DEVICE, AND READABLE STORAGE MEDIUM

(71) Applicant: DATANG MOBILE COMMUNICATIONS EQUIPMENT CO., LTD., Beijing (CN)

(72) Inventors: Xiaotao Ren, Beijing (CN); Bin Ren, Beijing (CN); Ren Da, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 525 days.

(21) Appl. No.: 17/925,294

(22) PCT Filed: Apr. 12, 2021

(86) PCT No.: PCT/CN2021/086621
§ 371 (c)(1),
(2) Date: Nov. 14, 2022

(87) PCT Pub. No.: WO2021/227741
PCT Pub. Date: Nov. 18, 2021

(65) Prior Publication Data
US 2023/0180040 A1    Jun. 8, 2023

(30) Foreign Application Priority Data

May 14, 2020 (CN) .......................... 202010406460.X

(51) Int. Cl.
*H04W 24/10* (2009.01)
*H04W 72/23* (2023.01)

(52) U.S. Cl.
CPC ........... *H04W 24/10* (2013.01); *H04W 72/23* (2023.01)

(58) Field of Classification Search
CPC ..... H04W 24/10; H04W 72/23; H04W 64/00; H04W 4/023; H04W 24/08; G01S 5/02;
(Continued)

(56) References Cited

U.S. PATENT DOCUMENTS

| | | | |
|---|---|---|---|
| 8,427,365 B2 * | 4/2013 | Dai | G01S 19/44 701/477 |
| 2013/0258874 A1 * | 10/2013 | Khoshnevis | H04L 1/0027 370/252 |

(Continued)

FOREIGN PATENT DOCUMENTS

| | | |
|---|---|---|
| CN | 106970406 A | 7/2017 |
| CN | 109196381 A | 1/2019 |

(Continued)

OTHER PUBLICATIONS

International Search Report for International Application No. PCT/CN2021/086621 issued on Jun. 23, 2021 and its English Translation provided by WIPO.

(Continued)

*Primary Examiner* — Will W Lin
(74) *Attorney, Agent, or Firm* — Ladas & Parry, LLP

(57) ABSTRACT

The present disclosure provides an information reporting method, an apparatus, a device and a readable storage medium. The method includes: acquiring a first reference signal; performing measurement according to the first reference signal to obtain a first phase measurement quantity; reporting the first phase measurement quantity; wherein, the first reference signal comprises at least one of the following reference signals: a C-PRS, a DL-PRS, a CSI-RS and a SSB; the first phase measurement quantity includes at least one of the following: an intra-cycle phase value, an integer ambiguity, and a whole-cycle phase value.

16 Claims, 5 Drawing Sheets

(58) Field of Classification Search
CPC ......... G01S 5/10; H04L 5/0057; H04L 5/005; H04L 5/0048
See application file for complete search history.

(56) References Cited

U.S. PATENT DOCUMENTS

| | | | |
|---|---|---|---|
| 2017/0269216 A1 | 9/2017 | Dai et al. | |
| 2017/0269231 A1* | 9/2017 | Dai | G01S 19/32 |
| 2017/0289831 A1 | 10/2017 | Park et al. | |
| 2018/0317186 A1* | 11/2018 | Fan | H04L 5/0035 |
| 2020/0041604 A1* | 2/2020 | Kim | G01S 5/10 |
| 2020/0100237 A1 | 3/2020 | Chae et al. | |
| 2020/0204317 A1 | 6/2020 | Kim et al. | |
| 2020/0408871 A1* | 12/2020 | Da | G01S 1/20 |
| 2021/0337496 A1 | 10/2021 | Da et al. | |

FOREIGN PATENT DOCUMENTS

| | | |
|---|---|---|
| CN | 110062457 A | 7/2019 |
| CN | 110231638 A | 9/2019 |
| CN | 111131997 A | 5/2020 |
| KR | 20090071782 A | 7/2009 |
| WO | 2019039812 A1 | 2/2019 |
| WO | 2019141090 A1 | 7/2019 |

OTHER PUBLICATIONS

Written Opinion for International Application No. PCT/CN2021/086621 issued on Jun. 23, 2021 and its English Translation provided by WIPO.

International Preliminary Report on Patentability No. PCT/CN2021/086621, issued on Nov. 15, 2022 and its English Translation provided by WIPO.

"Combined Downlink and Uplink NR Positioning Procedures," 3GPP TSG-RAN WG2 Meeting #104, R2-1817899 Agenda item: 11.8.2, Spokane, USA, Nov. 12-16, 2018, Agenda item: 11.8.2, Source: Qualcomm Incorporated, all pages.

First Office Action and search report for Chinese Patent Application 202010406460.X issued on Mar. 21, 2022, and ts English translation provided by the Chinese Patent Office.

"Discussion on Possible Techniques for NR Positioning," 3GPP TSG RAN WG1 Meeting #94bis, R1-1810315, Chengdu, China, Oct. 8-12, 2018, Agenda Item: 7.2.10.3, Source: LG Electronics, all pages.

The Extended European Search Report for the corresponding European Patent Application No. 21804056.6 issued by the European Patent Office on Aug. 24, 2023.

* cited by examiner

INFORMATION REPORTING METHOD, APPARATUS AND DEVICE, AND READABLE STORAGE MEDIUM

CROSS-REFERENCE TO RELATED APPLICATION

The present application claims a priority to the Chinese patent application No. 202010406460.X filed in China on May 14, 2020, a disclosure of which is incorporated herein by reference in its entirety.

TECHNICAL FIELD

The present disclosure relates to the field of communication technology, in particular to an information reporting method, an apparatus, a device, and a readable storage medium.

BACKGROUND

The technical solutions of downlink positioning mainly include delay-based DL-TDOA (Downlink-Time Difference Of Arrival) positioning method, angle-based DL-AoD (Downlink-Angle of Departure) positioning method, etc.

The delay-based DL-TDOA positioning method estimates the position of the terminal through the relative time delay between the base stations according to the difference of the propagation distance of the terminal relative to each base station. The angle-based DL-AoD positioning method determines the position of the terminal through multiple angle parameters according to the position direction of the terminal relative to the base station.

However, the system positioning accuracy of the positioning method according to the related art is low.

SUMMARY

An embodiment of the present disclosure provides an information reporting method, an apparatus, a device, and a readable storage medium, so as to improve system positioning accuracy.

In a first aspect, an embodiment of the present disclosure provides an information reporting method, applied to a terminal, including:
  acquiring a first reference signal;
  performing measurement according to the first reference signal to obtain a first phase measurement quantity;
  reporting the first phase measurement quantity;
  wherein, the first reference signal includes at least one of the following reference signals: a carrier phase positioning reference signal (C-PRS), a downlink positioning reference signal (DL-PRS), a channel state indication-reference signal (CSI-RS) and a synchronization signal block (SSB);
  the first phase measurement quantity includes at least one of the following: an intra-cycle phase value, an integer ambiguity, and a whole-cycle phase value.
  Wherein, the first phase measurement quantity is a downlink phase of arrival (DL-POA) or a downlink reference signal phase difference (DL-RSPD);
    wherein, the DL-POA or DL-RSPD is obtained according to at least one of the following: an intra-cycle phase value, an integer ambiguity, and a whole-cycle phase value.

Wherein, the DL-RSPD is a downlink relative phase difference between a positioning node j and a reference positioning node i;
  wherein, the DL-RSPD is calculated in the following manner:

DL-RSPD=$P$(receiving subframe,node $j$)−$P$(receiving subframe,node $i$);

wherein, P(receiving subframe, node j) represents a phase of a starting time point when the terminal receives a subframe from the positioning node j, and P (receiving subframe, node i) represents a phase of a starting time point of a subframe received by the terminal from the reference positioning node i that is closest in time to the subframe received from the positioning node j;
  the positioning node or reference positioning node includes a base station, a cell or a transmission and reception point (TRP).
  Wherein, the starting time point of the subframe from the node i or the node j is determined according to at least a first reference signal resource.
  Wherein, for a first frequency range, a reference point of the DL-RSPD is an antenna connector of the terminal; for a second frequency range, a reference point of the DL-RSPD is a terminal's antenna.
  Wherein, a unit of the first phase measurement quantity is a first time unit or a radian;
    if the first phase measurement quantity includes an integer ambiguity and the unit of the first phase measurement quantity is the first time unit, then the whole-cycle phase value is the integer part of the first time unit of a remaining phase measurement value part of the first phase measurement quantity;
    if the first phase measurement quantity includes the integer ambiguity and the unit of the first phase measurement quantity is the radian, then the whole-cycle phase value is the integer multiple part of $2\pi$ of the remaining phase measurement value part of the first phase measurement quantity;
    if the first phase measurement quantity does not include the integer ambiguity and the unit of the first phase measurement quantity is the first time unit, then the whole-cycle phase value is the integer part of the first time unit of the phase measurement value of the first phase measurement quantity;
    if the first phase measurement quantity does not include the integer ambiguity and the unit of the first phase measurement quantity is the radian, then the whole-cycle phase value is an integer multiple part of $2\pi$ of the phase measurement value of the first phase measurement quantity;
  wherein, the remaining phase measurement value is the remaining measurement value part after subtracting the integer ambiguity from the first phase measurement quantity.
  Wherein, the unit of the first phase measurement quantity is a first time unit or a radian;
    if the first phase measurement quantity includes an integer ambiguity and the unit of the first phase measurement quantity is the first time unit, then the intra-cycle phase value is a fractional part of the first time unit of a value part of a remaining phase measurement of the first phase measurement quantity;
    if the first phase measurement quantity includes an integer ambiguity and the unit of the first phase measurement quantity is the radian, then the intra-cycle phase value is a fractional multiple part of $2\pi$ of the remaining phase measurement value part of the first phase measurement quantity;

if the first phase measurement quantity does not include an integer ambiguity and the unit of the first phase measurement quantity is the first time unit, then the intra-cycle phase value is a fractional part of a first time unit of a phase measurement value of the first phase measurement quantity;

if the first phase measurement quantity does not include an integer ambiguity and the unit of the first phase measurement quantity is the radian, then the intra-cycle phase value is a fractional multiple part of $2\pi$ of the phase measurement value of the first phase measurement quantity;

wherein, the remaining phase measurement value part is the remaining measurement value part after subtracting the integer ambiguity from the first phase measurement quantity.

Wherein, the first time unit is G times the second time unit, wherein G is a positive number, and the second time unit is a seconds, a millisecond, a microsecond or a nanosecond.

Wherein, if the unit of the first phase measurement quantity is the first time unit:

when the first phase measurement quantity includes the intra-cycle phase value, the integer ambiguity and the whole-cycle phase value, the first phase measurement quantity is calculated in the following manner:

$POA = u \times A + N + M$; or $POA = A + N + M$;

when the first phase measurement quantity includes the intra-cycle phase value and the integer ambiguity, the first phase measurement quantity is calculated in the following manner:

$POA = u \times A + M$; or $POA = A + M$;

when the first phase measurement quantity includes the intra-cycle phase value and the whole-cycle phase value, the first phase measurement quantity is calculated in the following manner:

$POA = N + M$;

if the unit of the first phase measurement quantity is a radian:

when the first phase measurement quantity includes the intra-cycle phase value, the integer ambiguity and the whole-cycle phase value, the first phase measurement quantity is calculated in the following manner:

$POA = (u \times A + N + M) \times 2\pi$; or $POA = (A + N + M) \times 2\pi$;

when the first phase measurement quantity includes the intra-cycle phase value and the integer ambiguity, the first phase measurement quantity is calculated in the following manner:

$POA = (u \times A + M) \times 2\pi$; or $POA = (A + M) \times 2\pi$;

when the first phase measurement quantity includes the intra-cycle phase value and the whole-cycle phase value, the first phase measurement quantity is calculated in the following manner:

$POA = (N + M) \times 2\pi$;

wherein, POA represents the first phase measurement quantity; u represents the adjustment coefficient, which is an integer greater than or equal to 0; A represents the integer ambiguity; N represents the whole-cycle phase value; M represents the intra-cycle phase value.

Wherein, a reporting resolution of the first phase measurement quantity includes at least one of the following resolutions:

a reporting resolution of the integer ambiguity $R_A$ is: $R_A = 2^{k_A}$; wherein, $k_A$ is 0 or a positive integer;

a reporting resolution of the whole-cycle phase value $R_N$ is: $R_N = 2^{k_N}$; wherein, $k_N$ is 0 or a positive integer;

a reporting resolution of the intra-cycle phase value $R_M$ is:

$$R_M = \frac{1}{2^{k_M}};$$

wherein, $k_M$ is 0 or a positive integer.

Wherein, the method further includes:

reporting at least one of the following: measurement quality indication information and measurement confidence information.

Wherein, the measurement quality indication information includes at least one of the following: an error value $E_V$, an error resolution $E_R$ and a number of error sampling points $E_N$;

the measurement confidence information being used to represent the probability that the error value is $E_V$ in a confidence interval $[X_{min}, X_{max}]$, wherein $X_{min}, X_{max}$ respectively are numbers greater than 0;

wherein, the error value $E_R$ refers to an optimal estimation value of the uncertainty of the measurement value; the error resolution $E_R$ refers to $E_V$ the quantization step size of the indicating domain where the error value is located; and the number of error sampling points $E_N$ refers to the number of measurement quantities used in calculating the error value $E_V$.

Wherein, the method further includes:

obtaining a delay measurement quality according to the first phase measurement quantity;

reporting the delay measurement quantity and a relationship between the first phase measurement quantity and the delay measurement quantity.

Wherein, the method further includes:

performing position calculation of the terminal according to the first phase measurement quantity.

In a second aspect, an embodiment of the present disclosure provides an information reporting method, applied to a network device or a location management device, includes:

receiving a first phase measurement quantity;

performing position calculation of the terminal according to the first phase measurement quantity;

wherein, the first phase measurement quantity includes at least one of the following: an intra-cycle phase value, an integer ambiguity, and a whole-cycle phase value.

Wherein, the method further includes:

receiving at least one of the following: measurement quality indication information and measurement confidence information.

Wherein, the method further includes:

receiving a delay measurement quantity and a relationship between the first phase measurement quantity and the delay measurement quantity.

Wherein, the method further includes:

obtaining a delay measurement quantity according to the first phase measurement quantity.

In a third aspect, an embodiment of the present disclosure provides an information reporting apparatus, applied to a terminal, including:

a first acquiring module, configured to acquire a first reference signal;

a first processing module, configured to perform measurement according to the first reference signal to obtain a first phase measurement quantity;

a first reporting module, configured to report the first phase measurement quantity;

wherein, the first reference signal includes at least one of the following reference signals: a C-PRS, a DL-PRS, a CSI-RS and a SSB;

the first phase measurement quantity includes at least one of the following: an intra-cycle phase value, an integer ambiguity, and a whole-cycle phase value.

In a fourth aspect, an embodiment of the present disclosure provides an information reporting apparatus, applied to a network device or a location management device, comprising:

a first receiving module, configured to receive a first phase measurement quantity;

a first processing module, configured to perform position calculation of the terminal according to the first phase measurement quantity;

wherein, the first phase measurement quantity includes at least one of the following: an intra-cycle phase value, an integer ambiguity, and a whole-cycle phase value.

In a fifth aspect, an embodiment of the present disclosure provides an information reporting method, applied to a terminal, comprising: a transceiver, a memory, a processor, and a program stored in the memory and configured to run on the processor; wherein, the processor is configured to read the program in the memory and perform the following process:

acquiring a first reference signal;

performing measurement according to the first reference signal to obtain a first phase measurement quantity;

reporting the first phase measurement quantity;

wherein, the first reference signal includes at least one of the following reference signals: a C-PRS, a DL-PRS, a CSI-RS and a SSB;

the first phase measurement quantity includes at least one of the following: an intra-cycle phase value, an integer ambiguity, and a whole-cycle phase value.

Wherein, the first phase measurement quantity is DL-POA or DL-RSPD;

wherein, the DL-POA or DL-RSPD is obtained according to at least one of the following: an intra-cycle phase value, an integer ambiguity, and a whole-cycle phase value.

Wherein, the DL-RSPD is a downlink relative phase difference between a positioning node j and a reference positioning node i;

wherein, the DL-RSPD is calculated in the following manner:

DL-RSPD=$P$(receiving subframe,node $j$)−$P$(receiving subframe,node $i$);

wherein, P(receiving subframe, node j) represents a phase of a starting time point when the terminal receives a subframe from the positioning node j, and P (receiving subframe, node i) represents a phase of a starting time point of a subframe received by the terminal from the reference positioning node i that is closest in time to the subframe received from the positioning node j;

the positioning node or reference positioning node includes a base station, a cell or a TRP.

Wherein, the starting time point of the subframe from the node i or the node j is determined according to at least a first reference signal resource.

Wherein, for a first frequency range, a reference point of the DL-RSPD is an antenna connector of the terminal; for a second frequency range, a reference point of the DL-RSPD is a terminal's antenna.

Wherein, a unit of the first phase measurement quantity is a first time unit or a radian; the processor is configured to read the program in the memory and execute the following process:

if the first phase measurement quantity includes an integer ambiguity and the unit of the first phase measurement quantity is the first time unit, then the whole-cycle phase value is the integer part of the first time unit of a value part of a remaining phase measurement of the first phase measurement quantity;

if the first phase measurement quantity includes the integer ambiguity and the unit of the first phase measurement quantity is the radian, then the whole-cycle phase value is the integer multiple part of $2\pi$ of the remaining phase measurement value part of the first phase measurement quantity;

if the first phase measurement quantity does not include the integer ambiguity and the unit of the first phase measurement quantity is the first time unit, then the whole-cycle phase value is the integer part of the first time unit of the phase measurement of the first phase measurement quantity;

if the first phase measurement quantity does not include the integer ambiguity and the unit of the first phase measurement quantity is the radian, then the whole-cycle phase value is an integer multiple part of $2\pi$ of the phase measurement value of the first phase measurement quantity;

wherein, the remaining phase measurement value part is the remaining measurement value part after subtracting the integer ambiguity from the first phase measurement quantity.

Wherein, the unit of the first phase measurement quantity is a first time unit or a radian; the processor is configured to read the program in the memory and execute the following process:

if the first phase measurement quantity includes an integer ambiguity and the unit of the first phase measurement quantity is the first time unit, then the intra-cycle phase value is a fractional part of the first time unit of a value part of a remaining phase measurement of the first phase measurement quantity;

if the first phase measurement quantity includes an integer ambiguity and the unit of the first phase measurement quantity is the radian, then the intra-cycle phase value is a fractional multiple part of $2\pi$ of the remaining phase measurement value part of the first phase measurement quantity;

if the first phase measurement quantity does not include an integer ambiguity and the unit of the first phase measurement quantity is the first time unit, then the intra-cycle phase value is a fractional part of the first time unit of the phase measurement value of the first phase measurement quantity;

if the first phase measurement quantity does not include an integer ambiguity and the unit of the first phase measurement quantity is the radian, then the intra-cycle phase value is a fractional multiple part of $2\pi$ of the phase measurement value of the first phase measurement quantity;

wherein, the remaining phase measurement value is the remaining measurement value part after subtracting the integer ambiguity from the first phase measurement quantity.

Wherein, if the unit of the first phase measurement quantity is a first time unit: the processor is further configured to read the program in the memory and perform the following process:

when the first phase measurement quantity includes the intra-cycle phase value, the integer ambiguity and the whole-cycle phase value, the first phase measurement quantity is calculated in the following manner:

POA=$u \times A+N+M$; or

POA=$A+N+M$;

when the first phase measurement quantity includes the intra-cycle phase value and the integer ambiguity, the first phase measurement quantity is calculated in the following manner:

POA=$u \times A+M$; or

POA=$A+M$;

when the first phase measurement quantity includes the intra-cycle phase value and the whole-cycle phase value, the first phase measurement quantity is calculated in the following manner:

POA=$N+M$;

if the unit of the first phase measurement quantity is the radian:

when the first phase measurement quantity includes the intra-cycle phase value, the integer ambiguity and the whole-cycle phase value, the first phase measurement quantity is calculated in the following manner:

POA=$(u \times A+N+M) \times 2\pi$; or

POA=$(A+N+M) \times 2\pi$;

when the first phase measurement quantity includes the intra-cycle phase value and the integer ambiguity, the first phase measurement quantity is calculated in the following manner:

POA=$(u \times A+M) \times 2\pi$; or

POA=$(A+M) \times 2\pi$;

when the first phase measurement quantity includes the intra-cycle phase value and the whole-cycle phase value, the first phase measurement quantity is calculated in the following manner:

POA=$(N+M) \times 2\pi$;

wherein, POA represents the first phase measurement quantity; u represents the adjustment coefficient, which is an integer greater than or equal to 0; A represents the integer ambiguity; N represents the whole-cycle phase value; M represents the intra-cycle phase value.

Wherein, a reporting resolution of the first phase measurement quantity includes at least one of the following resolutions:

a reporting resolution of the integer ambiguity $R_A$ is: $R_A=2^{k_A}$; wherein, $k_A$ is 0 or a positive integer;

a reporting resolution of the whole-cycle phase value $R_N$ is: $R_N=2^{k_N}$; wherein, $k_N$ is 0 or a positive integer;

a reporting resolution of the intra-cycle phase value $R_M$ is:

$$R_M = \frac{1}{2^{k_M}};$$

wherein, $k_M$ is 0 or a positive integer.

Wherein, the processor is further configured to read the program in the memory and perform the following process:

reporting at least one of the following: measurement quality indication information and measurement confidence information.

Wherein, the processor is further configured to read the program in the memory and perform the following process:

obtaining a delay measurement quality according to the first phase measurement quantity;

reporting the delay measurement quantity and a relationship between the first phase measurement quantity and the delay measurement quantity.

Wherein, the processor is further configured to read the program in the memory and perform the following process:

performing position calculation of the terminal according to the first phase measurement quantity.

In a sixth aspect, an embodiment of the present disclosure provides an information reporting device, applied to a network device or a location management device, including: a transceiver, a memory, a processor, and a program stored in the memory and configured to run in the processor; wherein, the processor is configured to read the program in the memory and perform the following process:

receiving a first phase measurement quantity;

performing position calculation of the terminal according to the first phase measurement quantity;

wherein, the first phase measurement quantity includes at least one of the following: an intra-cycle phase value, an integer ambiguity, and a whole-cycle phase value.

Wherein, the processor is further configured to read a program in the memory and perform at least one of the following:

receiving at least one of the following: measurement quality indication information and measurement confidence information.

receiving a delay measurement quantity and a relationship between the first phase measurement quantity and the delay measurement quantity.

obtaining a delay measurement quantity according to the first phase measurement quantity.

In a seventh aspect, an embodiment of the present disclosure provides readable storage medium storing a program thereon, wherein the program is configured to be executed by a processor to implement the steps according to the first aspect or the second aspect as described above.

In this embodiment of the present disclosure, the first phase measurement quantity reported by the terminal includes at least one of an intra-cycle phase value, an integer ambiguity, and a whole-cycle phase value. Therefore, a position of the terminal can be calculated more accurately based on the content of the first phase measurement quantity, thereby avoiding the terminal positioning position deviation caused by insufficient accuracy of the delay measurement quantity in the related technologies, and further improving the system positioning accuracy by using the method of the embodiments of the present disclosure.

BRIEF DESCRIPTION OF THE DRAWINGS

The accompanying drawings described herein are used to provide further understanding of the present disclosure and constitute a part of the present disclosure. The exemplary embodiments of the present disclosure and their descriptions are used to explain the present disclosure and do not constitute an improper limitation of the present disclosure. The accompanying drawings are listed as below.

DETAILED DESCRIPTION

The technical solutions of the embodiments of the present disclosure will be clearly and completely described below with reference to the accompanying drawings of the embodiments of the present disclosure. Obviously, the described embodiments are part of the embodiments of the present disclosure, but not all of the embodiments. Based on the embodiments of the present disclosure, all other embodiments obtained by persons of ordinary skill in the art without creative efforts shall fall within the protection scope of the present disclosure.

Figure 1:
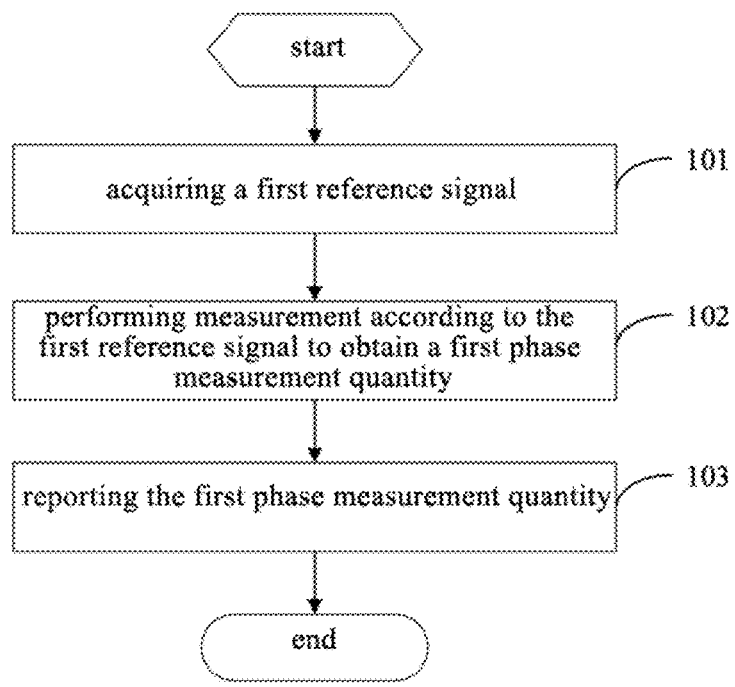
FIG. 1 is one of the flowcharts of the information reporting method according to an embodiment of the present disclosure.

FIG. 1 is a flowchart of an information reporting method according to an embodiment of the present disclosure, applied to a terminal, as shown in FIG. 1, including the following steps.

Step 101: acquiring a first reference signal.

In the embodiment of the present disclosure, the first reference signal includes at least one of the following reference signals: a carrier phase positioning reference signal (C-PRS), a downlink positioning reference signal (DL-PRS), a channel state indication-reference signal (CSI-RS) and a synchronization signal block (SSB). Of course, in practical applications, the first reference signal may also include other forms of reference signals.

Wherein, a virtual wavelength is constructed by using the first phase measurement measured by the C-PRS sent by multiple carrier frequencies, so as to speed up the spatial search speed of the integer ambiguity.

Step 102: performing measurement according to the first reference signal to obtain a first phase measurement quantity.

In the embodiment of the present disclosure, the method for measuring the first phase measurement quantity is not limited. The terminal can select the measurement method based on pre-configured or its own policy. The first phase measurement quantity includes at least one of the following: an intra-cycle phase value (M), an integer ambiguity (A), and a whole-cycle phase value (N).

Wherein, since the receiving side device cannot directly measure the number of integer cycles of phase changes experienced by the first reference signal on the propagation path through the first reference signal, there is an uncertainty problem of integer cycles. The integer ambiguity refers to the number of uncertain or ambiguous integer cycles that cannot be directly measured by the receiving side device. The whole-cycle phase value refers to the number of integer cycles of the phase change experienced by the first reference signal on the propagation path that the receiving side device can directly measure through the first reference signal. The intra-cycle phase value refers to the number of fractional cycles of the phase change experienced by the first reference signal on the propagation path that the receiving side device can directly measure through the first reference signal.

The first phase measurement quantity is DL-POA (Downlink Phase Of Arrival, downlink arrival phase) or DL-RSPD (Downlink Reference Signal Phase Difference), which can both obtained through the intra-cycle phase value (M), the integer ambiguity (A) and the whole-cycle phase value (N).

Wherein, the DL-RSPD is the relative downlink phase difference between the positioning node j and the reference positioning node i.

In this embodiment of the present disclosure, the DL-RSPD may be calculated in the following manner:

$$DL\text{-}RSPD = P(\text{receiving subframe,node } j) - P(\text{receiving subframe,node } i);$$

wherein, P(receiving subframe, node j) represents a phase of a starting time point when the terminal receives a subframe from the positioning node j, and P (receiving subframe, node i) represents a phase of a starting time point of a subframe received by the terminal from the reference positioning node i that is closest in time to the subframe received from the positioning node j.

In addition, the starting time point of the subframe from the node i or the node j may be determined according to the at least one first reference signal resource. The first reference signal resources may include C-PRS resources, DL-PRS resources, CSI-RS resources, SSB resources, etc. The positioning node refers to a base station, a cell, or a TRP (Transmission and Reception Point).

Figure 2:
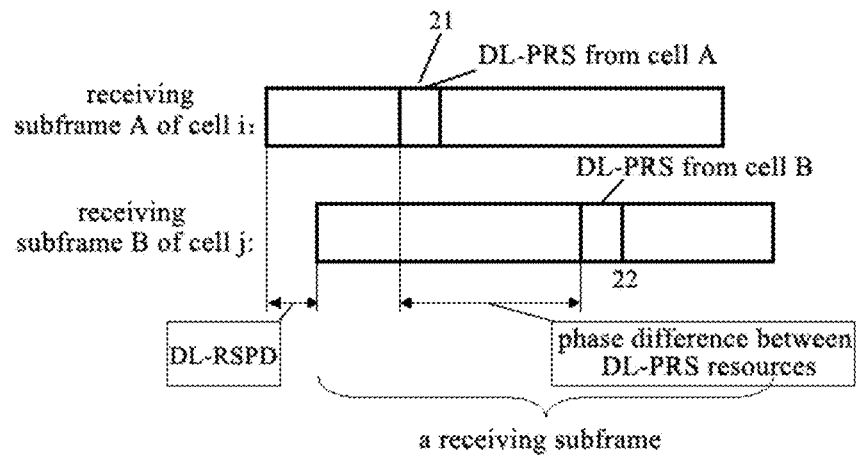
FIG. 2 is a schematic diagram of a DL-RSPD according to an embodiment of the present disclosure.

As shown in FIG. 2, the two rectangles in the figure represent the receiving subframe of cell i and the receiving subframe of cell j respectively, and receiving subframe B is the subframe closest in time between the receive subframe A received by the terminal from cell i and all the subframes received from cell j. In this way, the phase difference between the subframe starting time point of the receiving subframe A and the subframe starting time point of the receiving subframe B is the DL-RSPD. The small squares 21 and 22 represent DL-PRS resources, which are used to determine the subframe starting time point of cell i or cell j.

For the first frequency range (FR1, 410 MHz-7125 MHz), the reference point of the DL-RSPD is the antenna connector of the terminal; for the second frequency range (FR2, 24250 MHz-52600 MHz), the reference point of the DL-RSPD is the terminal's antenna.

Wherein, the unit of the first phase measurement quantity is a first time unit or a radian. The first time unit is G times the second time unit, where G is a positive number, and the second time unit is a second, a millisecond, a microsecond or a nanosecond.

In the embodiment of the present disclosure, the calculation method of the first phase measurement quantity may be determined according to the difference of the contents included in the first phase measurement quantity.

1. If the first phase measurement quantity includes the integer ambiguity:
   (1) The unit of the first phase measurement quantity is the first time unit:
   in this case, the whole-cycle phase value is the integer part of the first time unit of the remaining phase measurement value part of the first phase measurement quantity.
   (2) The unit of the first phase measurement quantity is radians:
   in this case, the whole-cycle phase value is the integral multiple of $2\pi$ of the remaining phase measurement value part of the first phase measurement quantity.
2. If the first phase measurement does not include integer ambiguity:
   (1) The unit of the first phase measurement quantity is the first time unit:
   in this case, the whole-cycle phase value is the integer part of the first time unit of the phase measurement value of the first phase measurement quantity.
   (2) The unit of the first phase measurement quantity is radians:
   in this case, the whole-cycle phase value is the integral multiple of $2\pi$ of the phase measurement value of the first phase measurement quantity.

Wherein, the remaining phase measurement value part is the remaining measurement value part after subtracting the integer ambiguity from the first phase measurement quantity.

3. If the first phase measurement quantity includes integer ambiguity:
   (1) The unit of the first phase measurement quantity is the first time unit:
   in this case, the intra-cycle phase value is the fractional part of the first time unit of the remaining phase measurement value part of the first phase measurement quantity.
   (2) The unit of the first phase measurement quantity is radians:
   in this case, the intra-cycle phase value is the fractional multiple part of $2\pi$ of the remaining phase measurement value part of the first phase measurement quantity.
4. If the first phase measurement does not include integer ambiguity:
   (1) The unit of the first phase measurement quantity is the first time unit:
   in this case, the intra-cycle phase value is the fractional part of the first time unit of the phase measurement value of the first phase measurement quantity.
   (2) The unit of the first phase measurement quantity is radians:
   in this case, the intra-cycle phase value is the fractional multiple part of $2\pi$ of the phase measurement value of the first phase measurement quantity.

Wherein, the remaining phase measurement value part is the remaining measurement value part after subtracting the integer ambiguity from the first phase measurement quantity.

Specifically, if the unit of the first phase measurement quantity is the first time unit, the first phase measurement quantity may be calculated in different ways according to different contents included in the first phase measurement quantity.

When the first phase measurement quantity includes the intra-cycle phase value, the integer ambiguity and the whole-cycle phase value, the first phase measurement quantity is calculated in the following manner:

$$POA=u \times A+N+M; \text{ or}$$

$$POA=A+N+M.$$

When the first phase measurement quantity includes the intra-cycle phase value and the integer ambiguity, the first phase measurement quantity is calculated in the following manner:

$$POA=u \times A+M; \text{ or}$$

$$POA=A+M.$$

When the first phase measurement quantity includes the intra-cycle phase value and whole-cycle phase value, the first phase measurement quantity is calculated in the following manner:

$$POA=N+M.$$

Specifically, if the unit of the first phase measurement quantity is radians, the first phase measurement quantity may be calculated in different ways according to different contents included in the first phase measurement quantity.

When the first phase measurement quantity includes the intra-cycle phase value, the integer ambiguity and the whole-cycle phase value, the first phase measurement quantity is calculated in the following manner:

$$POA=(u \times A+N+M) \times 2\pi; \text{ or}$$

$$POA=(A+N+M) \times 2\pi.$$

When the first phase measurement quantity includes the intra-cycle phase value and the integer ambiguity, the first phase measurement quantity is calculated in the following manner:

$$POA=(u \times A+M) \times 2\pi; \text{ or}$$

$$POA=(A+M) \times 2\pi.$$

When the first phase measurement quantity includes an intra-cycle phase value and a whole-cycle phase value, the first phase measurement quantity is calculated in the following manner:

$$POA=(N+M) \times 2\pi.$$

In the above formula, POA represents the first phase measurement quantity; u represents the adjustment coefficient, which is an integer greater than or equal to 0; A represents the integer ambiguity; N represents the whole-cycle phase value; M represents the intra-cycle phase value.

Wherein, the reporting resolution of the integer ambiguity $R_A$ is: $R_A=2^{k_A}$; wherein, $k_A$ is 0 or a positive integer, and its value is configurable, and the smaller the value of $k_A$, the higher the resolution.

Wherein, the reporting resolution of the whole-cycle phase value $R_N$ is: $R_N=2^{k_N}$; wherein, $k_N$ is 0 or a positive integer, and its value is configurable, and the smaller the value of $k_N$, the higher the resolution.

Wherein, the intra-cycle phase value has a different resolution than the whole-cycle phase value. The reporting resolution of the intra-cycle phase value $R_M$ is:

$$R_M = \frac{1}{2^{k_M}};$$

wherein, $k_M$ is U or a positive integer, and its value is configurable, and the larger the value of $k_M$, the higher the resolution.

In addition, according to at least one of the following information such as carrier operating frequency, carrier bandwidth, SCS (Sub Carrier Spacing), indoor or outdoor, and positioning accuracy requirements, the value of resolution $k_N$ or $k_M$ can be configured to meet the positioning accuracy requirements.

Step 103, reporting the first phase measurement quantity.

In practical applications, if the carrier frequency is very high (such as FR2), the intra-cycle phase value M (that is, the fractional part) in the first phase measurement quantity can be ignored, then the terminal can only report the integer ambiguity and the whole-cycle phase value to reduce reporting overhead.

In this embodiment of the present disclosure, the first phase measurement quantity reported by the terminal includes at least one of the following: an intra-cycle phase value, an integer ambiguity, and a whole-cycle phase value. Therefore, a more accurate position of the terminal can be calculated based on the content included in the first phase measurement quantity, thereby avoiding the terminal positioning position deviation caused by insufficient accuracy of the delay measurement quantity in the related art, and further improving the system positioning accuracy by using the method of the embodiments of the present disclosure.

In addition, in order to obtain a more accurate position of the terminal, the terminal may also report at least one of measurement quality indication information and measurement confidence information.

Wherein, each first phase measurement quantity may correspond to measurement quality indication information. The measurement quality indication information of the first phase measurement quantity includes at least one item of the following information: an error value $E_V$, an error resolution $E_R$, and the number of error sampling points $E_N$. Wherein, the error value $E_R$ refers to the optimal estimation value of the uncertainty of the measurement value; the error resolution $E_R$ refers to the quantization step size of the indicating domain where the error value $E_V$ is located; and the number of error sampling points refers to $E_V$ the number of measurement quantities used in calculating the error value $E_V$.

Wherein, each first phase measurement quantity may correspond to measurement confidence information. The confidence Y refers to the probability that the error value of the first phase measurement quantity $E_V$ is in the confidence interval $[X_{min}, X_{max}]$, that is:

$Y=\text{Prob}\{X_{min} \leq E_V \leq X_{max}\}$

Wherein, $X_{min}$, $X_{max}$ are the configuration information, $X_{min}$, $X_{max}$ are numbers greater than 0, respectively.

On the basis of the foregoing embodiment, the terminal may obtain the delay measurement quantity according to the first phase measurement quantity. During the specific reporting process of the terminal, since the terminal can calculate the corresponding TOA or TDOA through the first phase measurement quantity, if the first phase measurement quantity is configured, the terminal will no longer report the delay measurement quantity. Or, in the process of reporting the first phase measurement quantity, the terminal may also report the delay measurement quantity and the relationship between the first phase measurement quantity and the delay measurement quantity, so as to facilitate the receiving side device to perform measurement combination.

On the basis of the foregoing embodiment, the terminal may perform position calculation of the terminal according to the first phase measurement quantity. Specifically, if it is a UE-based (terminal-based) positioning solution, the terminal calculates and obtains the value of the first phase measurement quantity according to the integer ambiguity, the whole-cycle phase value and the intra-cycle phase value, and then completes the terminal's position calculation. If it is a network-based positioning solution, the terminal reports the integer ambiguity, the whole-cycle phase value and the intra-cycle phase value to the network device (such as a base station) or a location management device (such as LMF (Location Management Function)), the base station or LMF will perform the next step of terminal position calculation.

Figure 3:
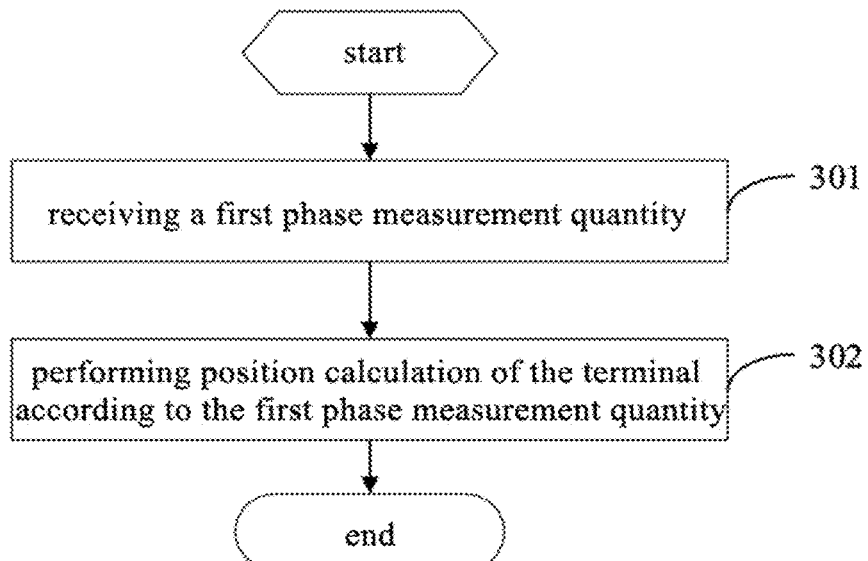
FIG. 3 is a second flowchart of an information reporting method according to an embodiment of the present disclosure.

FIG. 3 is a flowchart of an information reporting method according to an embodiment of the present disclosure, applied to a network device (such as a base station) or a location management device (such as an LMF), as shown in FIG. 3, including the following steps.

Step 301: receiving a first phase measurement quantity.

Wherein, the first phase measurement quantity includes at least one of the following: an intra-cycle phase value, an integer ambiguity, and a whole-cycle phase value. For the meaning of each piece of information in the first phase measurement quantity, reference may be made to the descriptions in the foregoing embodiments.

Step 302: performing position calculation of the terminal according to the first phase measurement quantity.

In this embodiment of the present disclosure, the first phase measurement quantity reported by the terminal includes at least one of the following: an intra-cycle phase value, an integer ambiguity, and a whole-cycle phase value. Therefore, a more accurate position of the terminal can be calculated through the content included in the first phase measurement quantity, thereby avoiding the deviation of the terminal positioning position caused by insufficient accuracy of the delay measurement quantity in the related art, and further improving the system positioning accuracy of the solution of the embodiments of the present disclosure.

Wherein, on the basis of the foregoing embodiment, the network device or the location management device may further receive at least one of the following: measurement quality indication information and measurement confidence information.

If the terminal reports the delay measurement quantity, the network device or the location management device may also receive the delay measurement quantity and the relationship between the first phase measurement quantity and the delay measurement quantity, so as to facilitate the position calculation of the terminal. If the terminal does not report the delay measurement quantity, the network device or the location management device may also obtain the delay measurement quantity according to the first phase measurement quantity, so as to facilitate the position calculation of the terminal.

In the embodiment of the present disclosure, it is assumed that the unit of the first phase measurement quantity is nanoseconds, including the integer ambiguity, the whole-cycle phase value, and the intra-cycle phase value.

Integer ambiguity A of the first phase measurement quantity: that is, the integral ambiguity part of the first phase measurement quantity. When the unit of the first phase measurement quantity is nanoseconds, the whole-cycle phase value N of the first phase measurement quantity is an integer part of nanoseconds of the remaining phase measurement value part of the first phase measurement quantity that does not include the integer ambiguity; when unit of the first phase measurement quantity is nanoseconds, the intra-cycle phase value M of the first phase measurement quantity is the fractional part of nanoseconds of the remaining phase measurement value part of the first phase measurement quantity that does not include the integer ambiguity. That is, the remaining phase measurement value part is the remaining measurement value part after subtracting the integer ambiguity from the first phase measurement quantity.

Wherein, the calculation method of the first phase measurement quantity is:

when the unit of the first phase measurement quantity is nanoseconds, POA=u*A+N+M;

wherein, u is a configurable adjustment coefficient whose value is 0 or a positive integer, A is the integer ambiguity, N is the whole-cycle phase value, and M is the intra-cycle phase value.

If the carrier frequency is high (such as FR2), the intra-cycle phase value M (that is, the fractional part) of the first phase measurement quantity can be ignored, and the terminal can only report the integer ambiguity and the whole-cycle phase value to reduce the reporting overhead.

It should be pointed out that, according to the calculation formula of the first phase measurement quantity POA=u*A+N+M, A is the integer ambiguity, then it is an unknown quantity for the UE (user equipment), that is, after the UE receives the downlink positioning reference signal, it does not know how many whole cycles have passed since the point of reference time, so there will be ambiguity issues. The integer ambiguity A cannot be obtained by measurement, but by spatial search, where the integer ambiguity A is an integer number of nanoseconds. The whole-cycle phase value N is the whole-cycle phase value that can be obtained by the UE through measurement, it is a known quantity for the UE and is the integer part of nanoseconds in the phase value obtained through measurement, and it is also the integer part of nanoseconds of the remaining phase measurement value part of the first phase measurement quantity that does not include the integer ambiguity. The intra-cycle phase value M is the intra-cycle phase value obtained by the UE through measurement, it is a known quantity for the UE and is the fractional part of the nanosecond of the phase value obtained through measurement, and it is also the fractional part of the nanosecond of the remaining phase measurement quantity that does not include the integer ambiguity. The whole-cycle phase value N and the intra-cycle phase value M together constitute the phase value known to the UE.

Figure 4:
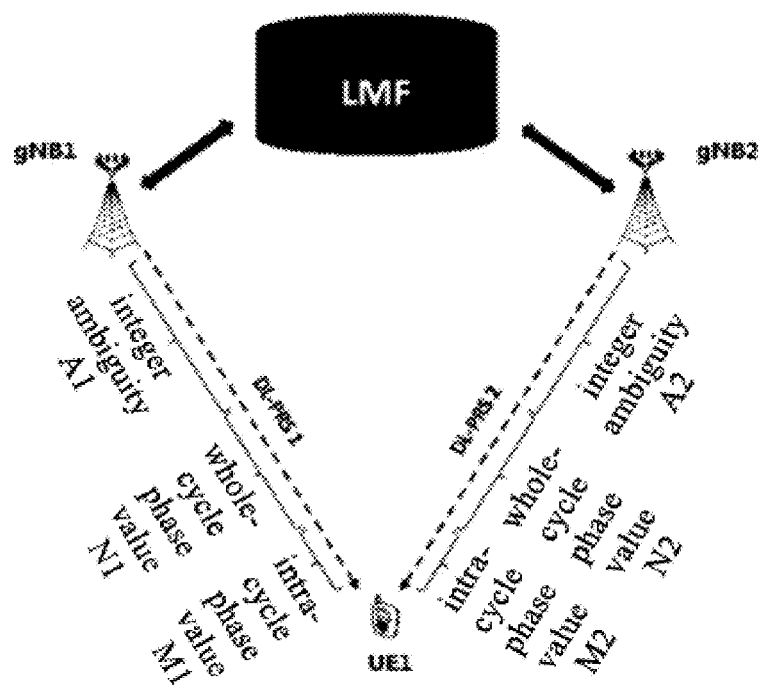
FIG. 4 is a schematic diagram of an information reporting method according to an embodiment of the present disclosure.

For example, as shown in FIG. 4, it is assumed that gNB1 is a serving base station of UE1, gNB2 is a neighboring base station of UE1, and gNB1 and gNB2 send downlink positioning reference signals DL-PRS1 and DL-PRS2 to UE1 respectively. The adjustment factor u is set to 1, and assuming that UE1 calculates the integer ambiguity A1=923 ns, N1=51 ns, M1=0.28 ns based on DL-PRS1 measurements from gNB1, and UE1 calculates the integer ambiguity A2=1265 ns, N2=72 ns, M2=0.65 ns based on DL-PRS2 measurements from gNB2, then:

The value of the first phase measurement quantity obtained according to DL-PRS1 is: POA1=u*A1+N1+M1=1*923+51+0.28=974.28 (nanosecond)

The value of the first phase measurement quantity obtained according to DL-PRS2 is: POA2=u*A2+N2+M2=1*1265+72+0.65=1337.65 (nanosecond)

If it is a UE-based positioning solution, UE1 can calculate the value of the first phase measurement quantity for DL-PRS1 and DL-PRS2 according to the above formula, and then complete the UE position calculation.

If it is a Network-based positioning solution, UE1 will report the measurements A1=923 ns, N1=51 ns, M1=0.28 ns obtained from DL-PRS1, and A2=1265 ns, N2=72 ns, M2=0.65 ns obtained from DL-PRS2 to gNB1 or LMF, which will perform further UE position calculation according to the above equation.

In the embodiment of the present disclosure, the first phase measurement quantity includes the integer ambiguity, the whole-cycle phase value and the intra-cycle phase value, and the unit thereof is nanoseconds. After the first phase measurement quantity is reported, the distance value does not need to be multiplied by the carrier wavelength, but directly multiplied by the speed of light to obtain the distance value. The phase value is the same for different carrier wavelengths, and the resolution is also the same, thereby improving the speed and efficiency of UE position calculation, and also improving the system positioning accuracy.

In the embodiment of the present disclosure, it is assumed that the unit of the first phase measurement quantity is radians, including the integer ambiguity, the whole-cycle phase value, and the intra-cycle phase value.

The integer ambiguity A of the first phase measurement quantity: that is, the integer ambiguity part of the first phase measurement quantity; when the unit of the first phase measurement quantity is radians, the whole-cycle phase value N of the first phase measurement quantity is an integral multiple part of $2\pi$ of the remaining phase measurement value part of the first phase measurement quantity that does not include the integer ambiguity; when the unit of the first phase measurement quantity is radians, the intra-cycle phase value M of the first phase measurement quantity is the fractional multiple part of $2\pi$ of the remaining phase measurement value part of the first phase measurement quantity that does not include the integer ambiguity. That is, the remaining phase measurement value part is the remaining measurement value part after subtracting the integer ambiguity from the first phase measurement quantity.

Wherein, the calculation method according to the first phase measurement quantity is:

when the first phase measurement quantity is radians, POA=(u×A+N+M)×2π;

wherein, u is a configurable adjustment coefficient whose value is 0 or a positive integer, A is the integer ambiguity, N is the whole-cycle phase value, and M is the intra-cycle phase value.

If the carrier frequency is very high (such as FR2), the intra-cycle phase value M (that is, the fractional part) of the first phase measurement quantity can be ignored, and only the integer ambiguity and the whole-cycle phase value can be reported to reduce the reporting overhead.

It should be pointed out that, according to the calculation formula of the first phase measurement quantity POA=(u×A+N+M)×2π, A is the integer ambiguity, which is an unknown quantity for the UE, that is, after the UE receives the downlink positioning reference signal, it does not know how many whole cycles have passed since the point of reference time, so there will be ambiguity issues. The integer ambiguity A cannot be obtained by measurement, but by spatial search, where the integer ambiguity A is an integer number of 2π. The whole-cycle phase value N is the whole-cycle phase value that can be obtained by the UE through measurement, it is a known quantity for the UE and is the integer part of 2π in the phase value obtained through measurement, and it is also the integer part of 2π of the remaining phase measurement value part of the first phase measurement quantity that does not include the integer ambiguity. The intra-cycle phase value M is the intra-cycle phase value obtained by the UE through measurement, it is a known quantity for the UE and is the fractional part of the nanosecond of the phase value obtained through measurement, and it is also the fractional part of the nanosecond of the remaining phase measurement quantity that does not include the integer ambiguity. The whole-cycle phase value N and the intra-cycle phase value M together constitute the phase value known to the UE.

Figure 5:
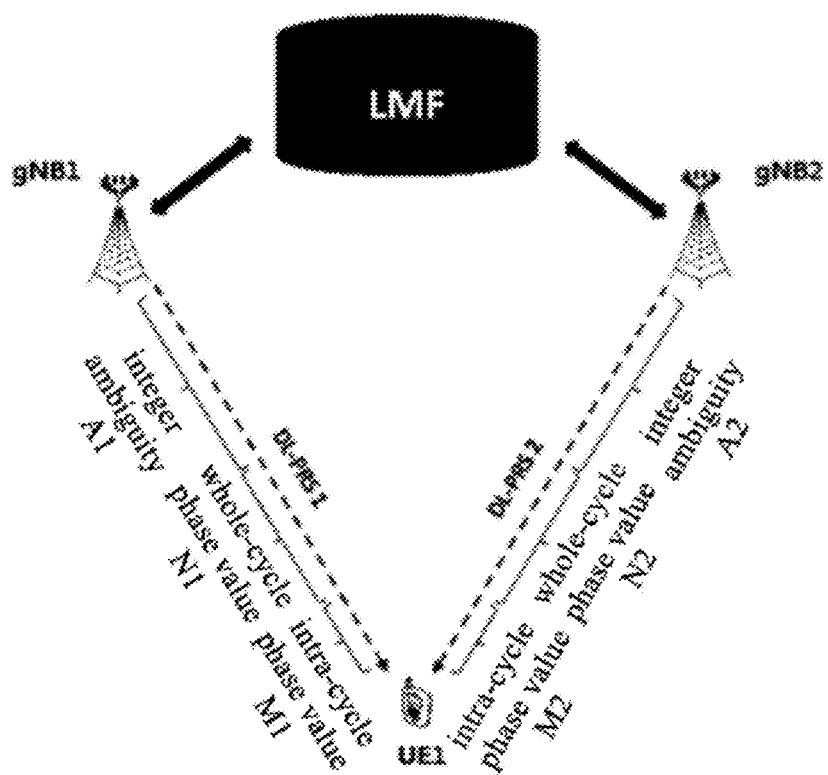
FIG. 5 is a second schematic diagram of an information reporting method according to an embodiment of the present disclosure.

For example, as shown in FIG. 5, it is assumed that gNB1 is the serving base station of UE1, gNB2 is the neighboring base station of UE1, and gNB1 and gNB2 send downlink positioning reference signals DL-PRS1 and DL-PRS2 to UE1 respectively. The adjustment factor u is set to 1, and assuming that UE1 calculates the integer ambiguity A1=4023 ns, N1=89 ns, M1=0.35 ns based on DL-PRS1 measurements from gNB1, and UE1 calculates the integer ambiguity A2=1265 ns, N2=72 ns, M2=0.65 ns based on DL-PRS2 measurements from gNB2, then:

The value of the first phase measurement quantity obtained according to DL-PRS1 is: POA1=(u*A+N+M)×2π=(1*4032+89+0.35)×2π=4121.35×2π (radians).

The value of the first phase measurement obtained according to DL-PRS2 is: POA1=(u*A+N+M)×2π=(1*3876+96+0.86)×2π=3972.86×2π (radians).

If it is a UE-based positioning solution, UE1 can calculate the value of the first phase measurement quantity for DL-PRS1 and DL-PRS2 according to the above formula, and then complete the UE position calculation.

If it is a Network-based positioning solution, UE1 will report A1=4032, N1=89, M1=0.35 according to DL-PRS1, and A2=3876, N2=96, M2=0.86, etc. obtained according to DL-PRS2 to gNB1 or LMF, which will perform further UE position calculation according to the above equation.

In the embodiment of the present disclosure, the first phase measurement quantity includes an integer ambiguity, a whole-cycle phase value, and an intra-cycle phase value, and the unit thereof is radians. Wherein, the integer ambiguity and the whole-cycle phase value both are integer multiples of 2π, which are integer multiples of the phase within a wavelength in the true physical sense, thereby improving the speed and efficiency of UE position calculation and improving the system positioning accuracy.

In the embodiment of the present disclosure, the unit of the first phase measurement quantity is nanoseconds, which includes a whole-cycle phase value and an intra-cycle phase value.

When the unit of the first phase measurement quantity is nanoseconds, the whole-cycle phase value N of the first phase measurement quantity is an integer part of nanoseconds of the phase measurement value in the first phase measurement quantity; when the unit of the first phase measurement quantity is nanoseconds, the intra-cycle phase value M of the first phase measurement quantity is the fractional part of nanoseconds of the phase measurement value in the first phase measurement quantity;

wherein, the calculation method of the first phase measurement quantity is:
when unit of the first phase measurement quantity is nanoseconds, POA=N+M;
wherein, N is the whole-cycle phase value, and M is the intra-cycle phase value.

If the carrier frequency is very high (such as FR2), the phase value M (that is, the fractional part) of the first phase measurement quantity can be ignored, and only the whole-cycle phase value can be reported to reduce the reporting overhead.

It should be pointed out that, according to the calculation formula of the first phase measurement quantity POA=N+M, the whole-cycle phase value N is the whole-cycle phase value obtained by the UE through measurement.

It is a known quantity for the UE and is the integer part of nanoseconds in the phase value obtained through measurement, and it is also the integer part of nanoseconds of the remaining phase measurement value part of the first phase measurement quantity that does not include the integer ambiguity. The intra-cycle phase value M is the intra-cycle phase value obtained by the UE through measurement, it is a known quantity for the UE and is the fractional part of the nanosecond of the phase value obtained through measurement, and it is also the fractional part of the nanosecond of the phase measurement value of the remaining phase measurement. The whole-cycle phase value N and the intra-cycle phase value M together constitute the phase value known to the UE.

Figure 6:
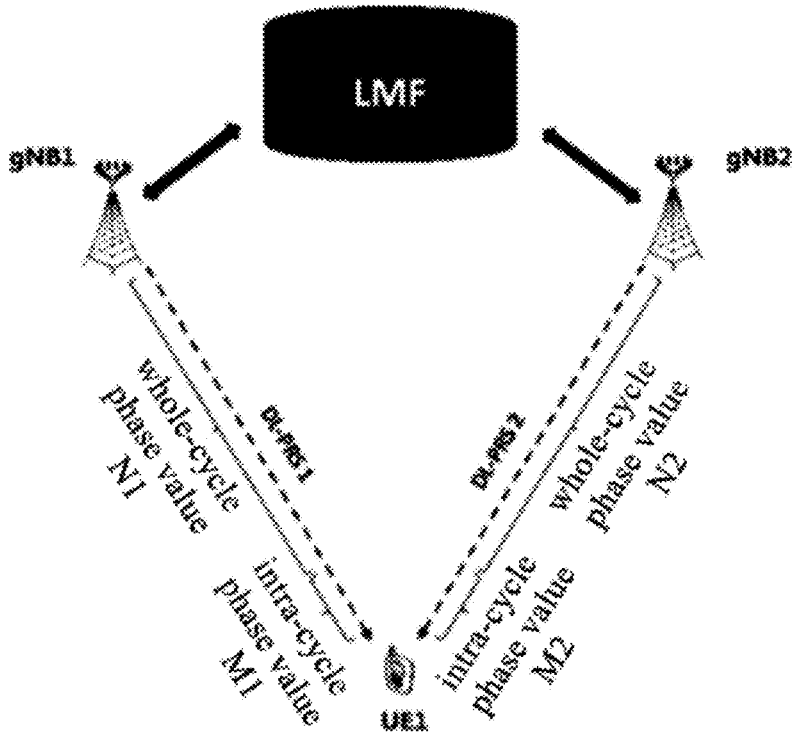
FIG. 6 is a third schematic diagram of an information reporting method according to an embodiment of the present disclosure.

For example, as shown in FIG. 6, it is assumed that gNB1 is a serving base station of UE1, gNB2 is a neighboring base station of UE1, and gNB1 and gNB2 send downlink positioning reference signals DL-PRS1 and DL-PRS2 to UE1 respectively. Assume that UE1 calculates N1=51 ns and M1=0.28 ns according to the DL-PRS1 measurement from gNB1, and UE1 calculates N2=72 ns and M2=0.65 ns according to the DL-PRS2 measurement from gNB2, then:

The value of the first phase measurement quantity obtained according to DL-PRS1 is:

POA1=N1+M1=51+0.28=51.28 (nanosecond)

The value of the first phase measurement obtained according to DL-PRS2 is:

POA2=N2+M2=72+0.65=72.65 (nanosecond)

If it is a UE-based positioning solution, UE1 can calculate the value of the first phase measurement quantity for DL-PRS1 and DL-PRS2 according to the above formula, and then complete the UE position calculation.

If it is a Network-based positioning solution, UE1 will measure N1=51 ns and M1=0.28 ns obtained from DL-PRS1, and N2=72 ns and M2=0.65 ns obtained from DL-PRS2. It is reported to gNB1 or LMF, and gNB or LMF performs further UE position calculation according to the above formula.

In the embodiment of the present disclosure, the first phase measurement quantity includes two pieces of information, such as an whole-cycle phase value and an intra-cycle phase value, and the unit thereof is nanoseconds. After the first phase measurement quantity is reported, the distance value does not need to be multiplied by the carrier wavelength, but directly multiplied by the speed of light to obtain the distance value. The phase value is the same for different carrier wavelengths, and the resolution is also the same, thereby improving the speed and efficiency of UE position calculation, and also improving the system positioning accuracy.

In the embodiment of the present disclosure, the unit of the first phase measurement quantity is radians, which includes a whole-cycle phase value and an intra-cycle phase value.

When the unit of the first phase measurement quantity is radians, the whole-cycle phase value N of the first phase measurement quantity is an integral multiple of $2\pi$ of the phase measurement value of the first phase measurement quantity; when the unit of the first phase measurement quantity is radians, the intra-cycle phase value M of the first phase measurement quantity is fractional multiples of $2\pi$ of the phase measurement value of the first phase measurement quantity;

Wherein, the calculation method of the first phase measurement quantity is:

When the unit of the first phase measurement quantity is radians, $POA=(N+M)\times 2\pi$;

wherein, N is the whole-cycle phase value, and M is the intra-cycle phase value.

If the carrier frequency is very high (such as FR2), the phase value M (that is, the fractional part) of the first measurement quantity can be ignored, and only the whole-cycle phase value can be reported to reduce the reporting overhead.

It should be pointed out that, according to the calculation formula of the first phase measurement quantity $POA=(N+M)\times 2\pi$, the whole-cycle phase value N is the whole-cycle phase value that can be obtained by the UE through measurement, it is a known quantity for the UE and is an integer multiple of $2\pi$ in the phase value obtained through measurement, and is also the phase in the first phase measurement quantity. Integer part of the measured value. The intra-cycle phase value M is the intra-cycle phase value obtained by the UE through measurement. It is a known quantity to the UE and is a fractional multiple part of $2\pi$ in the phase value obtained through measurement, which is also a fractional part of $2\pi$ in the phase measurement quantity. The in the whole-cycle phase value N and the intra-cycle phase value M together constitute the phase value known to the UE.

Figure 7:
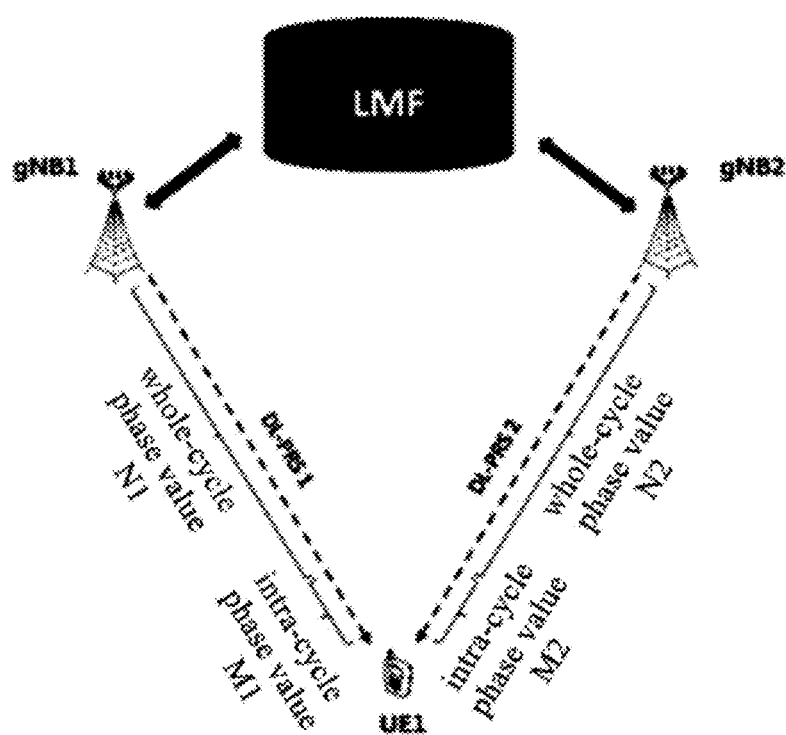
FIG. 7 is a fourth schematic diagram of an information reporting method according to an embodiment of the present disclosure.

For example, as shown in FIG. 7, it is assumed that gNB1 is a serving base station of UE1, gNB2 is a neighboring base station of UE1, and gNB1 and gNB2 send downlink positioning reference signals DL-PRS1 and DL-PRS2 to UE1 respectively. Assuming that UE1 calculates N1=89 and M1=0.35 according to the DL-PRS1 measurement from gNB1, and UE1 calculates N2=96 and M2=0.86 according to the DL-PRS2 measurement from gNB2, then:

The value of the first phase measurement quantity obtained according to DL-PRS1 is:

POA1=$(N+M)\times 2\pi$=$(89+0.35)\times 2\pi$=$89.35\times 2\pi$ (radians)

The value of the first phase measurement obtained according to DL-PRS2 is:

POA1=$(N+M)\times 2\pi$=$(96+0.86)\times 2\pi$=$96.86\times 2\pi$(radians)

If it is a UE-based positioning solution, UE1 can calculate the value of the first phase measurement quantity for DL-PRS1 and DL-PRS2 according to the above formula, and then complete the UE position calculation.

If it is a Network-based positioning solution, UE1 will report the measured values such as N1=89, M1=0.35 obtained from DL-PRS1, and N2=96, M2=0.86 obtained from DL-PRS2 to gNB1 or LMF, and gNB or the LMF performs further UE position calculation according to the above formula.

In the embodiment of the present disclosure, the first phase measurement quantity includes two pieces of information, such as a whole-cycle phase value and an intra-cycle phase value, and its unit is radians. Wherein, the whole-cycle phase value is an integer multiple of $2\pi$, which is an integer multiple of the phase within a wavelength in the real physical sense, thereby improving the speed and efficiency of UE position calculation, and also improving the system positioning accuracy.

In an embodiment of the present disclosure, the following resolutions can also be calculated.

Resolution of integer ambiguity: the reporting resolution of the whole-cycle phase value $R_A$ is:

$R_A=2^{k_A}$

Wherein, $k_A$ is 0 or a positive integer, its value can be configured, the $k_A$ smaller the value, the higher the resolution.

Resolution of the whole-cycle phase value: the reporting resolution of the whole-cycle phase value $R_N$ is:

$R_N=2^{k_N}$

Wherein, $k_N$ is 0 or a positive integer, its value can be configured, the $k_N$ smaller the value, the higher the resolution.

Resolution of intra-cycle phase values: the intra-cycle phase value has a different resolution than the whole-cycle phase value. The reporting resolution of the intra-cycle phase value $R_M$ is:

$$R_M = \frac{1}{2^{k_M}}$$

Wherein, $k_M$ is 0 or a positive integer, and its value is configurable, $k_M$ the larger the value, the higher the resolution.

According to at least one piece of information such as carrier operating frequency, carrier bandwidth, subcarrier spacing SCS, indoor or outdoor, and positioning accuracy requirements, configure the value of resolution $k_N$ or $k_M$ to meet the positioning accuracy requirements.

For example: if the system positioning accuracy is required to be centimeters, the required positioning distance resolution is 1 centimeter. If the system configuration requires, when the first phase measurement quantity is composed of the whole-cycle phase value and the intra-cycle phase value, and the first time unit is nanoseconds, 1 nanosecond corresponds to 0.3 meters.

Assuming the system configuration $k_A=0$, the resolution of the whole-cycle phase value is:

$R_A=2^{k_A}=1$ nanosecond

That is, the time resolution of the whole-cycle phase value is 1 nanosecond, and the corresponding distance resolution is 0.3 meters.

Assuming the system configuration $k_M=5$, the resolution of the intra-cycle phase value is:

$$R_M = \frac{1}{2^{k_M}} = 1/32 \text{ nanosecond}$$

That is, the time resolution of the intra-cycle phase value is ⅟₃₂ nanosecond, and the corresponding distance resolution is about 0.01 meters.

In this way, it can be seen that the resolution of the first phase measurement quantity composed of the whole-cycle phase value and the intra-cycle phase value can reach the level of 1 cm.

In this embodiment of the present disclosure, each first phase measurement quantity may correspond to measurement quality indication information. The measurement quality indication information of the first phase measurement quantity includes at least one item of information, such as an error value $E_V$, an error resolution $E_R$, and the number of error sampling points $E_N$. Wherein, the error value $E_R$ refers to the optimal estimation value of the uncertainty of the measurement value; the error resolution $E_R$ refers to the quantization step size of the indicating domain where the error value $E_V$ is located; and the number of error sampling points $E_N$ refers to the number of measurement quantities used in calculating the error value $E_V$.

Each first phase measurement quantity may correspond to measurement confidence information. The confidence Y refers to the probability that the error value $E_V$ of the first phase measurement quantity is in the confidence interval $[X_{min}, X_{max}]$, that is:

$$Y = \text{Prob}\{X_{min} \leq E_V \leq X_{max}\}$$

Wherein, $X_{min}, X_{max}$ is the configuration information, and both are greater than 0.

For example, when the unit of the first phase measurement quantity is nanoseconds, the error value $E_V$ is replaced by 5 bits, different bit sequences represent different error values, and the error resolution $E_R$ is selected from the collection {0.01 m, 0.1 m, 1 m, 10 m} and reported by the UE to meet different positioning accuracy requirements indoors or outdoors. The number of error sampling points $E_N$ is the number of sampling points used by the UE for error measurement, and may be set to 1000, for example.

When configuration confidence interval of the system $[X_{min}, X_{max}]$ is [0 cm, 5 cm], if 950 of the 1000 error values $E_V$ of the first phase measurement quantity are in the interval [0 cm, 5 cm], the confidence Y=95%. The UE can measure and report the confidence, so that the base station can use this to evaluate the measurement quality of the current phase measurement.

When the terminal reports, there are the following two reporting methods.

(1) The terminal reports one of the first phase measurement quantity and the delay measurement quantity.

Since the terminal can calculate the corresponding TOA or TDOA through the first phase measurement quantity, if the phase measurement is configured, the delay measurement will no longer be reported.

(2) The terminal simultaneously reports the first phase measurement quantity and the delay measurement quantity.

The terminal reports the first phase measurement quantity and the delay measurement quantity, and configures the correlation or correspondence between the first phase measurement quantity and the delay measurement quantity, so as to facilitate the receive side device to combine the measurement quantity.

Specifically, since multiple positioning methods can be configured and used at the same time, such as the positioning method based on time measurement and the positioning method based on phase measurement; at the same time, in order to support multiple positioning methods, multiple positioning measurement quantities will also be configured at the same time, such as time delay measurement quantity (TOA (Time Of Arrival) or TDOA (Time Difference Of Arrival)) and phase measurement quantity (POA (Phase Of Arrival) or PDOA (Phase Difference Of Arrival, arrival phase difference)). Since the phase measurement quantity is more accurate and more precise, and the delay measurement quantity can be calculated from the phase measurement, if the phase measurement quantity is configured, the delay measurement quantity will not be reported.

In addition, considering that if the terminal reports the delay measurement quantity and the first phase measurement quantity at the same time, the reliability of positioning can be improved and the positioning delay can be reduced, the system can also configure the terminal to report the phase measurement quantity and the delay measurement quantity at the same time. In this case, in order to facilitate the combination of measurement quantities on the receiving side, when reporting these measurement quantities, the terminal will simultaneously report the correlation between the phase measurement quantity and the delay measurement quantity.

It can be seen from the above description that, by using the solutions of the embodiments of the present disclosure, a more accurate position of the terminal can be calculated through the reported information such as the whole-cycle phase value and the intra-cycle phase value of the phase measurement, which avoids the deviation of terminal positioning position caused by the insufficient accuracy of time delay measurement quantity in the related technology, and thus improves the system positioning accuracy.

Figure 8:
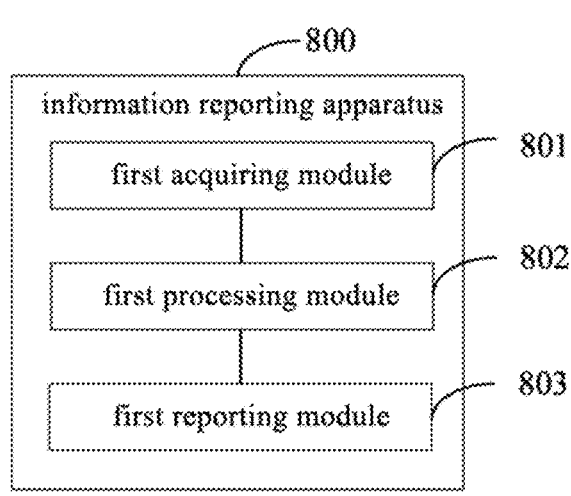
FIG. 8 is a structural diagram of an information reporting apparatus according to an embodiment of the present disclosure.

The embodiment of the present disclosure also provides an information reporting apparatus, which is applied to a terminal. FIG. 8 is a structural diagram of an information reporting apparatus according to an embodiment of the present disclosure. Since the principle of the information reporting apparatus for solving the problem is similar to the information reporting method in the embodiment of the present disclosure, the implementation of the information reporting apparatus can refer to the implementation of the method, and details are not described herein again in this embodiment.

As shown in FIG. 8, the information reporting apparatus 800 includes:

a first acquiring module 801, configured to acquire a first reference signal; a first processing module 802, configured to perform measurement according to the first reference signal to obtain a first phase measurement quantity; a first reporting module 803, configured to report the first phase measurement quantity; wherein, the first reference signal includes at least one of the following reference signals: a C-PRS, a DL-PRS, a CSI-RS and a SSB;

the first phase measurement quantity includes at least one of the following: an intra-cycle phase value, an integer ambiguity, and a whole-cycle phase value.

Optionally, the first phase measurement quantity is a DL-POA or a DL-RSPD; wherein, the DL-POA or DL-RSPD is obtained according to at least one of the following: an intra-cycle phase value, an integer ambiguity, and a whole-cycle phase value.

Optionally, the DL-RSPD is a downlink relative phase difference between a positioning node j and a reference positioning node i;

wherein, the DL-RSPD is calculated in the following manner:

DL-RSPD=$P$(receiving subframe,node $j$)−$P$(receiving subframe,node $i$);

wherein, P(receiving subframe, node j) represents a phase of a starting time point when the terminal receives a subframe from the positioning node j, and P(receiving subframe, node i) represents a phase of a starting time point of a subframe received by the terminal from the reference positioning node i that is closest in time to the subframe received from the positioning node j;

the positioning node or reference positioning node includes a base station, a cell or a transmission and reception point (TRP).

Wherein, the starting time point of the subframe from the node i or the node j is determined according to at least a first reference signal resource.

Optionally, for a first frequency range, a reference point of the DL-RSPD is an antenna connector of the terminal; for a second frequency range, a reference point of the DL-RSPD is a terminal's antenna.

Optionally, a unit of the first phase measurement quantity is a first time unit or a radian;

if the first phase measurement quantity includes an integer ambiguity and the unit of the first phase measurement quantity is the first time unit, then the whole-cycle phase value is the integer part of the first time unit of a value part of a remaining phase measurement of the first phase measurement quantity;

if the first phase measurement quantity includes the integer ambiguity and the unit of the first phase measurement quantity is the radian, then the whole-cycle phase value is the integer multiple part of $2\pi$ of the remaining phase measurement value part of the first phase measurement quantity;

if the first phase measurement quantity does not include the integer ambiguity and the unit of the first phase measurement quantity is the first time unit, then the whole-cycle phase value is the integer part of the first time unit of the phase measurement of the first phase measurement quantity;

if the first phase measurement quantity does not include the integer ambiguity and the unit of the first phase measurement quantity is the radian, then the whole-cycle phase value is the integer multiple part of $2\pi$ of the phase measurement value of the first phase measurement quantity;

wherein, the remaining phase measurement value is the remaining measurement value part after subtracting the integer ambiguity from the first phase measurement quantity.

Optionally, the unit of the first phase measurement quantity is a first time unit or a radian;

if the first phase measurement quantity includes an integer ambiguity and the unit of the first phase measurement quantity is the first time unit, then the intra-cycle phase value is a fractional part of the first time unit of a value part of a remaining phase measurement of the first phase measurement quantity;

if the first phase measurement quantity includes an integer ambiguity and the unit of the first phase measurement quantity is the radian, then the intra-cycle phase value is a fractional multiple part of $2\pi$ of the remaining phase measurement value part of the first phase measurement quantity;

if the first phase measurement quantity does not include an integer ambiguity and the unit of the first phase measurement quantity is the first time unit, then the intra-cycle phase value is a fractional part of the first time unit of the phase measurement value of the first phase measurement quantity;

if the first phase measurement quantity does not include an integer ambiguity and the unit of the first phase measurement quantity is the radian, then the intra-cycle phase value is a fractional multiple part of $2\pi$ of a phase measurement value of the first phase measurement quantity;

wherein, the remaining phase measurement value part is the remaining measurement value part after subtracting the integer ambiguity from the first phase measurement quantity.

Optionally, the first time unit is G times the second time unit, wherein G is a positive number, and the second time unit is a seconds, a millisecond, a microsecond or a nanosecond.

Optionally, if the unit of the first phase measurement quantity is the first time unit:

when the first phase measurement quantity includes the intra-cycle phase value, the integer ambiguity and the whole-cycle phase value, the first phase measurement quantity is calculated in the following manner:

$$POA = u \times A + N + M; \text{ or}$$

$$POA = A + N + M;$$

when the first phase measurement quantity includes the intra-cycle phase value and the integer ambiguity, the first phase measurement quantity is calculated in the following manner:

$$POA = u \times A + M; \text{ or}$$

$$POA = A + M;$$

when the first phase measurement quantity includes the intra-cycle phase value and the whole-cycle phase value, the first phase measurement quantity is calculated in the following manner:

$$POA = N + M;$$

if the unit of the first phase measurement quantity is a radian:

when the first phase measurement quantity includes the intra-cycle phase value, the integer ambiguity and the whole-cycle phase value, the first phase measurement quantity is calculated in the following manner:

$$POA = (u \times A + N + M) \times 2\pi; \text{ or}$$

$$POA = (A + N + M) \times 2\pi;$$

when the first phase measurement quantity includes the intra-cycle phase value and the integer ambiguity, the first phase measurement quantity is calculated in the following manner:

$$POA = (u \times A + M) \times 2\pi; \text{ or}$$

$$POA = (A + M) \times 2\pi;$$

when the first phase measurement quantity includes the intra-cycle phase value and the whole-cycle phase value, the first phase measurement quantity is calculated in the following manner:

$$POA = (N + M) \times 2\pi;$$

wherein, POA represents the first phase measurement quantity; u represents the adjustment coefficient, which is an integer greater than or equal to 0; A represents the integer ambiguity; N represents the whole-cycle phase value; M represents the intra-cycle phase value.

Optionally, a reporting resolution of the first phase measurement quantity includes at least one of the following resolutions:
a reporting resolution of the integer ambiguity $R_A$ is: $R_A = 2^{k_A}$; wherein, $k_A$ is 0 or a positive integer;
a reporting resolution of the whole-cycle phase value $R_N$ is: $R_N = 2^{k_N}$; wherein, $k_N$ is 0 or a positive integer;
a reporting resolution of the intra-cycle phase value $R_M$ is:

$$R_M = \frac{1}{2^{k_M}};$$

wherein, $k_M$ is 0 or a positive integer.

Optionally, the apparatus further includes: a second reporting module, configured to report at least one of the following: measurement quality indication information and measurement confidence information.

Optionally, the measurement quality indication information includes at least one of the following: an error value $E_V$, an error resolution $E_R$ and a number of error sampling points $E_N$;
the measurement confidence information being used to represent the probability that the error value is $E_V$ in a confidence interval $[X_{min}, X_{max}]$, wherein $X_{min}, X_{max}$ respectively are numbers greater than 0;
wherein, the error value $E_R$ refers to an optimal estimation value of the uncertainty of the measurement value; the error resolution $E_R$ refers to $E_V$ the quantization step size of the indicating domain where the error value is located; and the number of error sampling points $E_N$ refers to the number of measurement quantities used in calculating the error value $E_V$.

Optionally, the apparatus further includes: a third reporting module, configured to obtain a delay measurement quality according to the first phase measurement quantity; a fourth reporting module, configured to report the delay measurement quantity and a relationship between the first phase measurement quantity and the delay measurement quantity.

Optionally, the apparatus further includes: a second processing module, configured to perform position calculation of the terminal according to the first phase measurement quantity.

The apparatus provided by the embodiment of the present disclosure can be configured to execute the foregoing method embodiments, and the implementation principles and technical effects thereof are similar, and details are not described herein again in this embodiment.

Figure 9:
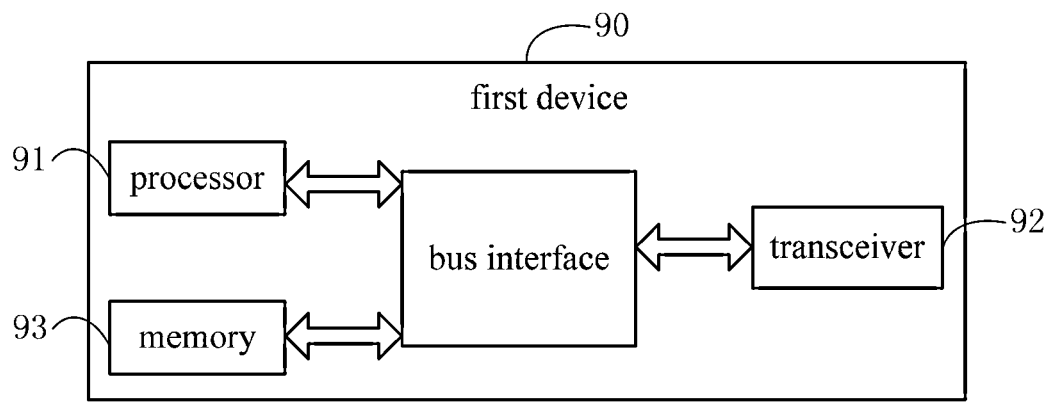
FIG. 9 is a second structural diagram of an information reporting apparatus according to an embodiment of the present disclosure.

The embodiment of the present disclosure also provides an information reporting apparatus, which is applied to a network device or a location management device. FIG. 9 is a structural diagram of an information reporting apparatus according to an embodiment of the present disclosure. Since the principle of the information reporting device for solving the problem is similar to the information reporting method in the embodiment of the present disclosure, the implementation of the information reporting apparatus can refer to the implementation of the method, and details are not described herein again in this embodiment.

As shown in FIG. 9, the information reporting apparatus 900 includes: a first receiving module 901, configured to receive a first phase measurement quantity; a first processing module 902, configured to perform position calculation of the terminal according to the first phase measurement quantity; wherein, the first phase measurement quantity includes at least one of the following: an intra-cycle phase value, an integer ambiguity, and a whole-cycle phase value.

Optionally, the apparatus further includes: a second receiving module, configured to receive at least one of the following: measurement quality indication information and measurement confidence information.

Optionally, the apparatus further includes: a third receiving module, configured to receive a delay measurement quantity and a relationship between the first phase measurement quantity and the delay measurement quantity.

Optionally, the apparatus further includes: a second processing module, configured to obtain a delay measurement quantity according to the first phase measurement quantity.

The apparatus provided by the embodiment of the present disclosure can be configured to execute the foregoing method embodiments, and the implementation principles and technical effects thereof are similar, and details are not described herein again in this embodiment.

Figure 10:
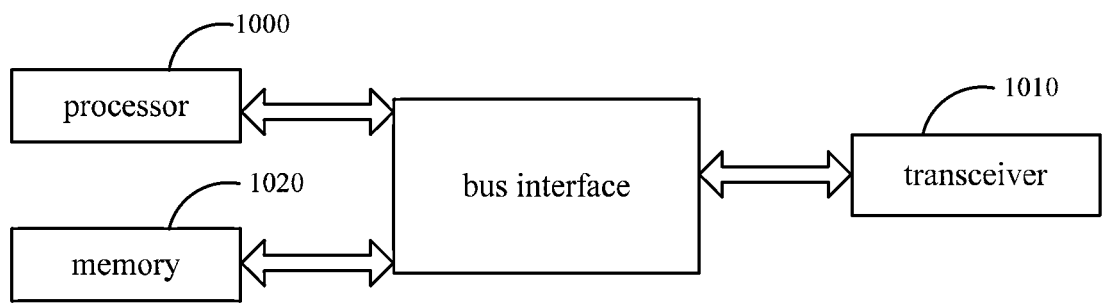
FIG. 10 is a structural diagram of an information reporting device according to an embodiment of the present disclosure.

The embodiments of the present disclosure also provide an information reporting device, which is applied to a network device or a location management device. Since the principle of the information reporting device for solving the problem is similar to the information reporting method in the embodiment of the present disclosure, the implementation of the terminal may refer to the implementation of the method, and details are not described herein again in this embodiment. As shown in FIG. 10, the device of the embodiment of the present disclosure includes: a processor 1000, configured to read a program in memory 1020, and execute the following processes:
receiving a first phase measurement quantity;
performing position calculation of the terminal according to the first phase measurement quantity;
wherein, the first phase measurement quantity includes at least one of the following: an intra-cycle phase value, an integer ambiguity, and a whole-cycle phase value.

A transceiver 1010, configured to receive and transmit data under the control of the processor 1000.

Wherein, in FIG. 10, the bus architecture may include any number of interconnected buses and bridges, specifically various circuits such as one or more processors represented by the processor 1000 and the memory represented by the memory 1020 are connected together. The bus architecture can also connect various other circuits such as peripheral devices, voltage regulators, power management circuits, etc., which are all known in the field, and therefore, will not be further described herein. The bus interface provides the interface. The transceiver 1010 may be a plurality of elements, that is, including a transmitter and a receiver, and provide a unit for communicating with various other devices on the transmission medium.

The processor 1000 is responsible for managing the bus architecture and general processing, and the memory 1020 can store data used by the processor 1000 when performing operations.

The processor 1000 is further configured to read the program and perform the following steps: receiving at least one of measurement quality indication information and measurement confidence information.

The processor 1000 is further configured to read the program and perform the following steps: receiving the delay measurement quantity and the relationship between the first phase measurement quantity and the delay measurement quantity.

The processor 1000 is further configured to read the program and perform the following steps: obtaining a delay measurement quantity according to the first phase measurement quantity.

The device provided by the embodiment of the present disclosure can be configured to execute the above method embodiments, and the implementation principles and technical effects thereof are similar, and details are not described herein again in this embodiment.

Figure 11:
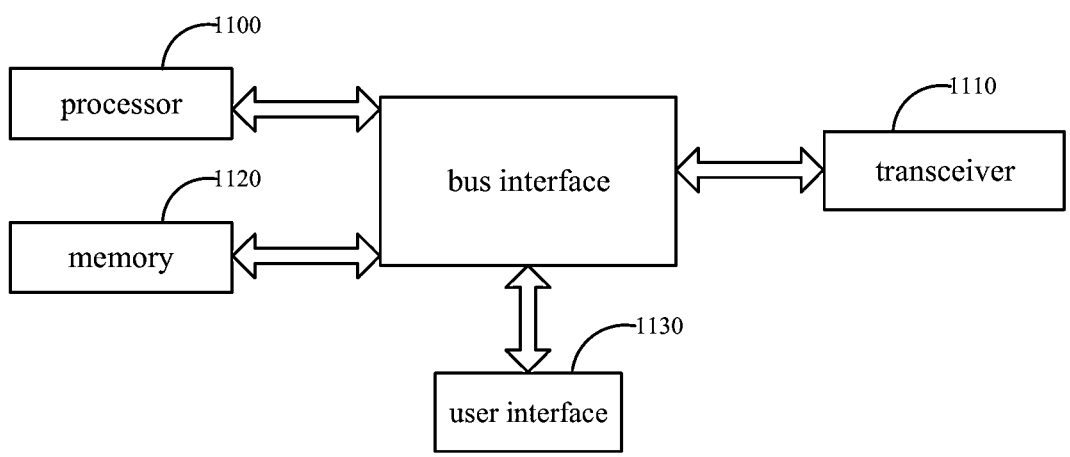
FIG. 11 is a second structural diagram of an information reporting device according to an embodiment of the present disclosure.

The embodiment of the present disclosure also provides an information reporting device, which is applied to a terminal. Since the principle of the information reporting device for solving the problem is similar to the information reporting method in the embodiment of the present disclosure, the implementation of the information reporting device can refer to the implementation of the method, and details are not described herein again in this embodiment. As shown in FIG. 11, the device of the embodiment of the present disclosure includes: a processor 1100, configured to read a program of the memory 1120 and execute the following processes:

acquiring a first reference signal;
performing measurement according to the first reference signal to obtain a first phase measurement quantity;
reporting the first phase measurement quantity;
wherein, the first reference signal includes at least one of the following reference signals: a C-PRS, a DL-PRS, a CSI-RS and a SSB;
the first phase measurement quantity includes at least one of the following: an intra-cycle phase value, an integer ambiguity, and a whole-cycle phase value.
a transceiver 1110, configured to receive and transmit data under the control of the processor 1100.

Wherein, in FIG. 11, the bus architecture may include any number of interconnected buses and bridges, specifically various circuits such as one or more processors represented by the processor 1100 and the memory represented by the memory 1120 are connected together. The bus architecture can also connect various other circuits such as peripheral devices, voltage regulators, power management circuits, etc., which are all known in the field, and therefore, will not be further described herein. The bus interface provides the interface. The transceiver 1110 may be a plurality of elements, that is, including a transmitter and a receiver, and provide a unit for communicating with various other devices on the transmission medium. For different terminals, the user interface 1130 may also be an interface capable of connecting externally or internally to required equipment. The connected equipment includes, but is not limited to, a keypad, a display, a speaker, a microphone, a joystick, etc. The processor 1100 is responsible for managing the bus architecture and general processing, and the memory 1120 can store data used by the processor 1100 when performing operations.

Wherein, the first phase measurement quantity is DL-POA or DL-RSPD;
wherein, the DL-POA or DL-RSPD is obtained according to at least one of the following: an intra-cycle phase value, an integer ambiguity, and a whole-cycle phase value.
Wherein, the DL-RSPD is a downlink relative phase difference between a positioning node j and a reference positioning node i;
wherein, the DL-RSPD is calculated in the following manner:

DL-RSPD=$P$(receiving subframe,node $j$)–$P$(receiving subframe,node $i$);

wherein, P(receiving subframe, node j) represents a phase of a starting time point when the terminal receives a subframe from the positioning node j, and P (receiving subframe, node i) represents a phase of a starting time point of a subframe received by the terminal from the reference positioning node i that is closest in time to the subframe received from the positioning node j;
the positioning node or reference positioning node includes a base station, a cell or a TRP.

Wherein, the starting time point of the subframe from the node i or the node j is determined according to at least a first reference signal resource.

Wherein, for a first frequency range, a reference point of the DL-RSPD is an antenna connector of the terminal; for a second frequency range, a reference point of the DL-RSPD is a terminal's antenna.

Wherein a unit of the first phase measurement quantity is a first time unit or a radian; the processor 1100 is configured to read the program in the memory and execute the following process:

if the first phase measurement quantity includes an integer ambiguity and the unit of the first phase measurement quantity is the first time unit, then the whole-cycle phase value is the integer part of the first time unit of a value part of a remaining phase measurement of the first phase measurement quantity;
if the first phase measurement quantity includes the integer ambiguity and the unit of the first phase measurement quantity is the radian, then the whole-cycle phase value is the integer multiple part of $2\pi$ of the remaining phase measurement value part of the first phase measurement quantity;
if the first phase measurement quantity does not include the integer ambiguity and the unit of the first phase measurement quantity is the first time unit, then the whole-cycle phase value is the integer part of the first time unit of the phase measurement of the first phase measurement quantity;
if the first phase measurement quantity does not include the integer ambiguity and the unit of the first phase measurement quantity is the radian, then the whole-cycle phase value is an integer multiple part of $2\pi$ of the phase measurement value of the first phase measurement quantity;
wherein, the remaining phase measurement value part is the remaining measurement value part after subtracting the integer ambiguity from the first phase measurement quantity.

Wherein, the unit of the first phase measurement quantity is a first time unit or a radian; the processor 1100 is configured to read the program in the memory and execute the following process:

if the first phase measurement quantity includes an integer ambiguity and the unit of the first phase measurement quantity is the first time unit, then the intra-cycle phase value is a fractional part of the first time unit of a value part of a remaining phase measurement of the first phase measurement quantity;
if the first phase measurement quantity includes an integer ambiguity and the unit of the first phase measurement quantity is the radian, then the intra-cycle phase value is a fractional multiple part of $2\pi$ of the remaining phase measurement value part of the first phase measurement quantity;
if the first phase measurement quantity does not include an integer ambiguity and the unit of the first phase measurement quantity is the first time unit, then the intra-cycle phase value is a fractional part of the first time unit of the phase measurement value of the first phase measurement quantity;

if the first phase measurement quantity does not include an integer ambiguity and the unit of the first phase measurement quantity is the radian, then the intra-cycle phase value is a fractional multiple part of 2π of a phase measurement value of the first phase measurement quantity;

wherein, the remaining phase measurement value is the remaining measurement value part after subtracting the integer ambiguity from the first phase measurement quantity.

Wherein, if the unit of the first phase measurement quantity is a first time unit: the processor 1100 is further configured to read the program in the memory and perform the following process:

when the first phase measurement quantity includes the intra-cycle phase value, the integer ambiguity and the whole-cycle phase value, the first phase measurement quantity is calculated in the following manner:

$POA=u \times A+N+M$; or $POA=A+N+M$;

when the first phase measurement quantity includes the intra-cycle phase value and the integer ambiguity, the first phase measurement quantity is calculated in the following manner:

$POA=u \times A+M$; or $POA=A+M$;

when the first phase measurement quantity includes the intra-cycle phase value and the whole-cycle phase value, the first phase measurement quantity is calculated in the following manner:

$POA=N+M$;

if the unit of the first phase measurement quantity is the radian:

when the first phase measurement quantity includes the intra-cycle phase value, the integer ambiguity and the whole-cycle phase value, the first phase measurement quantity is calculated in the following manner:

$POA=(u \times A+N+M) \times 2\pi$; or $POA=(A+N+M) \times 2\pi$;

when the first phase measurement quantity includes the intra-cycle phase value and the integer ambiguity, the first phase measurement quantity is calculated in the following manner:

$POA=(u \times A+M) \times 2\pi$; or $POA=(A+M) \times 2\pi$;

when the first phase measurement quantity includes the intra-cycle phase value and the whole-cycle phase value, the first phase measurement quantity is calculated in the following manner:

$POA=(N+M) \times 2\pi$;

wherein, POA represents the first phase measurement quantity; u represents the adjustment coefficient, which is an integer greater than or equal to 0; A represents the integer ambiguity; N represents the whole-cycle phase value; M represents the intra-cycle phase value.

Wherein, a reporting resolution of the first phase measurement quantity includes at least one of the following resolutions:

a reporting resolution of the integer ambiguity $R_A$ is: $R_A=2^{k_A}$; wherein, $k_A$ is 0 or a positive integer;

a reporting resolution of the whole-cycle phase value $R_N$ is: $R_N=2^{k_N}$; wherein, $k_N$ is 0 or a positive integer;

a reporting resolution of the intra-cycle phase value $R_M$ is:

$$R_M = \frac{1}{2^{k_M}};$$

wherein, $k_M$ is 0 or a positive integer.

Wherein, the processor 1100 is further configured to read the program in the memory and perform the following process:

reporting at least one of the following: measurement quality indication information and measurement confidence information.

The processor 1100 is further configured to read the program in the memory and perform the following process:

obtaining a delay measurement quality according to the first phase measurement quantity;

reporting the delay measurement quantity and a relationship between the first phase measurement quantity and the delay measurement quantity.

The processor 1100 is further configured to read the program in the memory and perform the following process:

performing position calculation of the terminal according to the first phase measurement quantity.

The device provided by the embodiment of the present disclosure can execute the above method embodiments, and the implementation principles and technical effects thereof are similar, and details are not described herein again in this embodiment.

Embodiments of the present disclosure further provide a readable storage medium, where a program is stored on the readable storage medium, and the program is configured to be executed by a processor to implement each process of the foregoing information reporting method embodiments, and the same technical effects can be achieved, which will not be repeated here. The readable storage medium is, for example, a read-only memory (ROM), a random access memory (RAM), a magnetic disk or an optical disk, etc.

It should be noted that, herein, the terms "comprising", "including" or any other variation thereof are intended to encompass non-exclusive inclusion, such that a process, method, article or device comprising a series of elements includes not only those elements, but also other elements not expressly listed, or which are inherent to such a process, method, article or apparatus. Without further limitation, the inclusion of an element defined by the phrase "comprising a . . . " does not preclude the existence of another identical elements in the process, method, article or apparatus that includes the element.

From the description of the above embodiments, those skilled in the art can clearly understand that the method of the above embodiment can be implemented by means of software plus a necessary general-purpose hardware platform, and of course can also be implemented by hardware, but in many cases the former is better implementation. Based on this understanding, the technical solutions of the present disclosure, in essence, or the parts that make contributions to the prior art, can be embodied in the form of a software product, which is stored in a storage medium (such as ROM/RAM, magnetic disk, CD-ROM), including several instructions to enable a terminal (which may be a mobile phone, a computer, a server, an air conditioner, or a network device, etc.) to implement the methods described in the various embodiments of the present disclosure.

The embodiments of the present disclosure have been described above with reference to the accompanying drawings, but the present disclosure is not limited to the above-mentioned specific embodiments, which are merely illustrative rather than restrictive, and there are many forms that a person of ordinary skill in the art may make under the inspiration of the present disclosure without departing from the scope protected by the purposes and claims of the present disclosure, all of which fall within the protection of the present disclosure.

What is claimed is:

1. An information reporting method, applied to a terminal, comprising:
   acquiring a first reference signal;
   performing measurement according to the first reference signal to obtain a first phase measurement quantity;
   reporting the first phase measurement quantity;
   wherein, the first reference signal comprises at least one of the following reference signals: a carrier phase positioning reference signal (C-PRS), a downlink positioning reference signal (DL-PRS), a channel state indication reference signal (CSI-RS) and a synchronization signal block (SSB);
   the first phase measurement quantity comprises at least one of the following: an intra-cycle phase value, an integer ambiguity, and a whole-cycle phase value;
   wherein, the first phase measurement quantity is a downlink phase of arrival (DL-POA) or a downlink reference signal phase difference (DL-RSPD);
   wherein, the DL-POA or DL-RSPD is obtained according to at least one of the following: the intra-cycle phase value, the integer ambiguity, and the whole-cycle phase value;
   wherein the DL-RSPD is a downlink relative phase difference between a positioning node j and a reference positioning node i;
   wherein, the DL-RSPD is calculated in the following manner:

DL-RSPD=$P$(receiving subframe,node $j$)−$P$(receiving subframe,node $i$);

wherein, P(receiving subframe, node j) represents a phase of a starting time point when the terminal receives a subframe from the positioning node j, and P(receiving subframe, node i) represents a phase of a starting time point of a subframe received by the terminal from the reference positioning node i that is closest in time to the subframe received from the positioning node j;
   the positioning node or reference positioning node comprises a base station, a cell or a transmission and reception point (TRP);
   the starting time point of the subframe from the node i or the node j is determined according to at least a first reference signal resource.

2. The method according to claim 1, wherein, for a first frequency range, a reference point of the DL-RSPD is an antenna connector of the terminal; for a second frequency range, a reference point of the DL-RSPD is a terminal's antenna.

3. The method according to claim 1, wherein a unit of the first phase measurement quantity is a first time unit or a radian;
   when the first phase measurement quantity comprises the integer ambiguity and the unit of the first phase measurement quantity is the first time unit, the whole-cycle phase value is an integer part of a first time unit of a remaining phase measurement value part of the first phase measurement quantity;
   when the first phase measurement quantity comprises the integer ambiguity and the unit of the first phase measurement quantity is the radian, the whole-cycle phase value is an integer multiple part of $2\pi$ of the remaining phase measurement value part of the first phase measurement quantity;
   when the first phase measurement quantity does not comprise the integer ambiguity and the unit of the first phase measurement quantity is the first time unit, the whole-cycle phase value is an integer part of a first time unit of a phase measurement value of the first phase measurement quantity;
   when the first phase measurement quantity does not comprise the integer ambiguity and the unit of the first phase measurement quantity is the radian, the whole-cycle phase value is an integer multiple part of $2\pi$ of the phase measurement value of the first phase measurement quantity;
   wherein, the remaining phase measurement value part is a remaining measurement value part after subtracting the integer ambiguity from the first phase measurement quantity.

4. The method according to claim 1, wherein the unit of the first phase measurement quantity is a first time unit or a radian;
   when the first phase measurement quantity comprises the integer ambiguity and the unit of the first phase measurement quantity is the first time unit, the intra-cycle phase value is an integer part of a first time unit of a remaining phase measurement value part of the first phase measurement quantity;
   when the first phase measurement quantity comprises the integer ambiguity and the unit of the first phase measurement quantity is the radian, the intra-cycle phase value is an integer multiple part of $2\pi$ of the remaining phase measurement value part of the first phase measurement quantity;
   when the first phase measurement quantity does not comprise the integer ambiguity and the unit of the first phase measurement quantity is the first time unit, the intra-cycle phase value is an integer part of a first time unit of a phase measurement value of the first phase measurement quantity;
   when the first phase measurement quantity does not comprise the integer ambiguity and the unit of the first phase measurement quantity is the radian, the intra-cycle phase value is an integer multiple part of $2\pi$ of the phase measurement value of the first phase measurement quantity;
   wherein, the remaining phase measurement value part is a remaining measurement value part after subtracting the integer ambiguity from the first phase measurement quantity.

5. The method according to claim 1, wherein,
   when the unit of the first phase measurement quantity is a first time unit:
   when the first phase measurement quantity comprises the intra-cycle phase value, the integer ambiguity and the whole-cycle phase value, the first phase measurement quantity is calculated in the following manner:

POA=u×A+N+M; or

POA=A+N+M;

when the first phase measurement quantity comprises the intra-cycle phase value and the integer ambiguity, the first phase measurement quantity is calculated in the following manner:

POA=u×A+M; or

POA=A+M;

when the first phase measurement quantity comprises the intra-cycle phase value and the whole-cycle phase value, the first phase measurement quantity is calculated in the following manner:

POA=N+M;

when the unit of the first phase measurement quantity is a radian:
when the first phase measurement quantity comprises the intra-cycle phase value, the integer ambiguity and the whole-cycle phase value, the first phase measurement quantity is calculated in the following manner:

POA=(u×A+N+M)×2π; or

POA=(A+N+M)×1π;

when the first phase measurement quantity comprises the intra-cycle phase value and the integer ambiguity, the first phase measurement quantity is calculated in the following manner:

POA=(u×A+M)×2π; or

POA=(A+M)×2π;

when the first phase measurement quantity comprises the intra-cycle phase value and the whole-cycle phase value, the first phase measurement quantity is calculated in the following manner:

POA=(N+M)×2π;

wherein, POA represents the first phase measurement quantity; u represents the adjustment coefficient, which is an integer greater than or equal to 0; A represents the integer ambiguity; N represents the whole-cycle phase value; M represents the intra-cycle phase value.

6. The method according to claim 1, wherein a reporting resolution of the first phase measurement quantity comprises at least one of the following resolutions:
a reporting resolution of the integer ambiguity $R_A$ is: $R_A=2^{k_A}$; wherein, $k_A$ is 0 or a positive integer;
a reporting resolution of the whole-cycle phase value $R_N$ is: $R_N=2^{k_N}$; wherein, $k_N$ is 0 or a positive integer;
a reporting resolution of the intra-cycle phase value $R_M$ is:

$$R_M = \frac{1}{2^{k_M}};$$

wherein, $k_M$ is 0 or a positive integer.

7. The method according to claim 1, further comprising: reporting at least one of the following: measurement quality indication information and measurement confidence information.

8. The method according to claim 7, wherein the measurement quality indication information comprises at least one of the following: an error value $E_V$, an error resolution $E_R$ and a number of error sampling points $E_N$;

the measurement confidence information being used to represent the probability that the error value is $E_V$ in a confidence interval $[X_{min}, X_{max}]$, wherein $X_{min}$, $X_{max}$ respectively are numbers greater than 0;

wherein, the error value $E_R$ refers to an optimal estimation value of the uncertainty of the measurement value; the error resolution $E_R$ refers to $E_V$ the quantization step size of the indicating domain where the error value is located; and the number of error sampling points $E_N$ refers to the number of measurement quantities used in calculating the error value $E_V$.

9. A non-transitory readable storage medium for storing a program, wherein the program is configured to be executed by a processor to implement the steps of the information reporting method according to claim 1.

10. An information reporting method, applied to a network device or a location management device, comprising:
receiving a first phase measurement quantity;
performing position calculation of a terminal according to the first phase measurement quantity;
wherein, the first phase measurement quantity comprises at least one of the following: an intra-cycle phase value, an integer ambiguity, and a whole-cycle phase value;
wherein, the first phase measurement quantity is a downlink phase of arrival (DL-POA) or a downlink reference signal phase difference (DL-RSPD)
wherein, the DL-POA or DL-RSPD is obtained according to at least one of the following: the intra-cycle phase value, the integer ambiguity, and the whole-cycle phase value;
wherein the DL-RSPD is a downlink relative phase difference between a positioning node j and a reference positioning node i;
wherein, the DL-RSPD is calculated in the following manner:

DL-RSPD=P(receiving subframe,node j)−P(receiving subframe,node i);

wherein, P(receiving subframe, node j) represents a phase of a starting time point when the terminal receives a subframe from the positioning node j, and P(receiving subframe, node i) represents a phase of a starting time point of a subframe received by the terminal from the reference positioning node i that is closest in time to the subframe received from the positioning node j;
the positioning node or reference positioning node comprises a base station, a cell or a transmission and reception point (TRP);
the starting time point of the subframe from the node i or the node j is determined according to at least a first reference signal resource.

11. The method according to claim 10, further comprising:
receiving at least one of the following: measurement quality indication information and measurement confidence information.

12. The method according to claim 10, further comprising:
receiving a delay measurement quantity and a relationship between the first phase measurement quantity and the delay measurement quantity.

13. An information reporting device, applied to a network device or a location management device, comprising: a transceiver, a memory, a processor, and a program stored in the memory and configured to run in the processor; wherein, the processor is configured to read the program in the memory and perform the steps of the information reporting method according to claim 10.

14. A non-transitory readable storage medium for storing a program, wherein the program is configured to be executed by the processor to implement the steps of the information reporting method according to claim 10.

15. An information reporting device, applied to a terminal, comprising: a transceiver, a memory, a processor, and a program stored in the memory and configured to run on the processor; wherein, the processor is configured to read the program in the memory and perform the following process:

acquiring a first reference signal;

performing measurement according to the first reference signal to obtain a first phase measurement quantity;

reporting the first phase measurement quantity;

wherein, the first reference signal comprises at least one of the following reference signals: a carrier phase positioning reference signal (C-PRS), a downlink positioning reference signal (DL-PRS), a channel state indication reference signal (CSI-RS) and a synchronization signal block (SSB);

the first phase measurement quantity comprises at least one of the following: an intra-cycle phase value, an integer ambiguity, and a whole-cycle phase value;

wherein, the first phase measurement quantity is a downlink phase of arrival (DL-POA) or a downlink reference signal phase difference (DL-RSPD);

wherein, the DL-POA or DL-RSPD is obtained according to at least one of the following: the intra-cycle phase value, the integer ambiguity, and the whole-cycle phase value;

wherein the DL-RSPD is a downlink relative phase difference between a positioning node j and a reference positioning node i;

wherein, the DL-RSPD is calculated in the following manner:

DL-RSPD=$P$(receiving subframe,node $j$)–$P$(receiving subframe,node $i$);

wherein, P(receiving subframe, node j) represents a phase of a starting time point when the terminal receives a subframe from the positioning node j, and P(receiving subframe, node i) represents a phase of a starting time point of a subframe received by the terminal from the reference positioning node i that is closest in time to the subframe received from the positioning node j;

the positioning node or reference positioning node comprises a base station, a cell or a transmission and reception point (TRP);

the starting time point of the subframe from the node i or the node j is determined according to at least a first reference signal resource.

16. The device according to claim 15, wherein, for a first frequency range, a reference point of the DL-RSPD is an antenna connector of the terminal; for a second frequency range, a reference point of the DL-RSPD is a terminal's antenna.

* * * * *